United States Patent [19]
Yokoyama et al.

[11] Patent Number: 6,144,435
[45] Date of Patent: *Nov. 7, 2000

[54] LIQUID CRYSTAL DEVICE, PROCESS FOR PRODUCING SAME AND LIQUID CRYSTAL APPARATUS

[75] Inventors: Yuko Yokoyama, Yokohama; Yuichi Masaki, Kawasaki; Kazuya Ishiwata, Yokosuka; Tetsuro Saito, Isehara; Yoshinori Shimamura, Ohisomachi; Tadashi Mihara, Isehara; Kazunori Katakura, Atsugi; Sunao Mori, Yokohama; Chikako Tsujita, Atsugi, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/638,219

[22] Filed: Apr. 26, 1996

[30] Foreign Application Priority Data

| Apr. 28, 1995 | [JP] | Japan | 7-127503 |
| Apr. 28, 1995 | [JP] | Japan | 7-127504 |
| Apr. 28, 1995 | [JP] | Japan | 7-127505 |
| Dec. 29, 1995 | [JP] | Japan | 7-352788 |

[51] Int. Cl.⁷ .......... G02F 1/1333; G02F 1/1343; G02F 1/1341; G02F 1/1339
[52] U.S. Cl. .......... 349/133; 349/122; 349/139; 349/189; 349/190; 349/155
[58] Field of Search .......... 349/106, 109, 349/110, 122, 123, 138, 139, 111, 192, 155, 158, 160, 162, 151, 189, 190, 33; 324/770

[56] References Cited

U.S. PATENT DOCUMENTS

| 4,728,176 | 3/1988 | Tsuboyama et al. | 349/155 |
| 4,932,757 | 6/1990 | Hanyu et al. | 349/138 |
| 5,042,920 | 8/1991 | Yoshino et al. | 349/106 |
| 5,073,219 | 12/1991 | McArdle et al. | 349/123 |
| 5,078,475 | 1/1992 | Sekimura et al. | 349/106 |
| 5,128,784 | 7/1992 | Suzuki et al. | 349/143 |
| 5,142,392 | 8/1992 | Ueki et al. | 349/111 |
| 5,270,846 | 12/1993 | Watanabe et al. | 359/74 |
| 5,336,535 | 8/1994 | Fukuchi et al. | 349/122 |
| 5,361,153 | 11/1994 | Shimamune et al. | 349/139 |
| 5,381,256 | 1/1995 | Hanyu et al. | 349/138 |
| 5,412,494 | 5/1995 | Ishiwata et al. | 349/110 |
| 5,437,896 | 8/1995 | Kloosterboer et al. | 349/106 |
| 5,479,284 | 12/1995 | Watanabe et al. | 349/155 |
| 5,530,568 | 6/1996 | Yamamoto et al. | 349/139 |

FOREIGN PATENT DOCUMENTS

| 0226218 | 6/1987 | European Pat. Off. . |
| 324433 | 7/1989 | European Pat. Off. . |
| 381526 | 8/1990 | European Pat. Off. . |
| 62-205319 | 9/1987 | Japan . |
| 63-070228 | 3/1988 | Japan | 349/155 |
| 63-163424 | 7/1988 | Japan . |
| 5088164 | 4/1993 | Japan . |

OTHER PUBLICATIONS

Patent Abstracts of Japan, vol. 17, No. 428 (Aug. 9, 1993) (P–1588).
Patent Abstracts of Japan, vol. 12, No. 431 (Nov. 15, 1988) (P–786).

*Primary Examiner*—William L. Sikes
*Assistant Examiner*—Toan Ton
*Attorney, Agent, or Firm*—Fitzpatrick, Cella, Harper & Scinto

[57] ABSTRACT

A liquid crystal device, comprising: a pair of substrates each provided with an electrode including one substrate having thereon a color filter and a coating layer, and a liquid crystal layer comprising a chiral smectic liquid crystal disposed together with spacer beads between the pair of substrates, wherein the liquid crystal layer has a thickness smaller than a diameter of the spacer beads and a maximum thickness of the coating layer, the coating layer having a pencil hardness of at most 7 H. The above layer structure between the substrates is effective in improving resistance to external shock and providing a uniform cell gap.

34 Claims, 30 Drawing Sheets

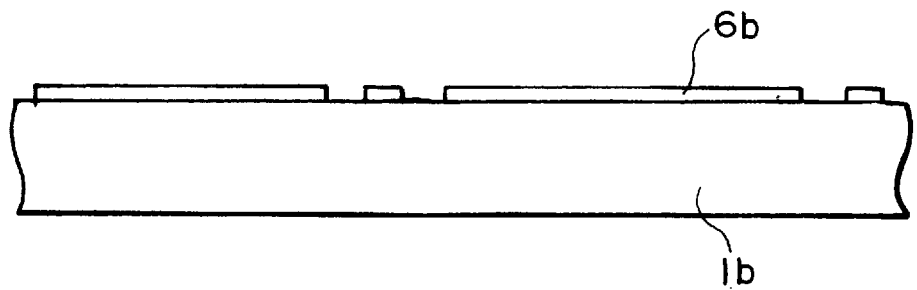
F I G. 6A
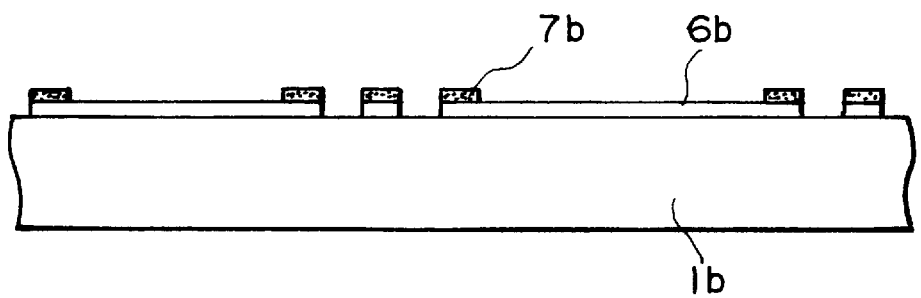
F I G. 6B
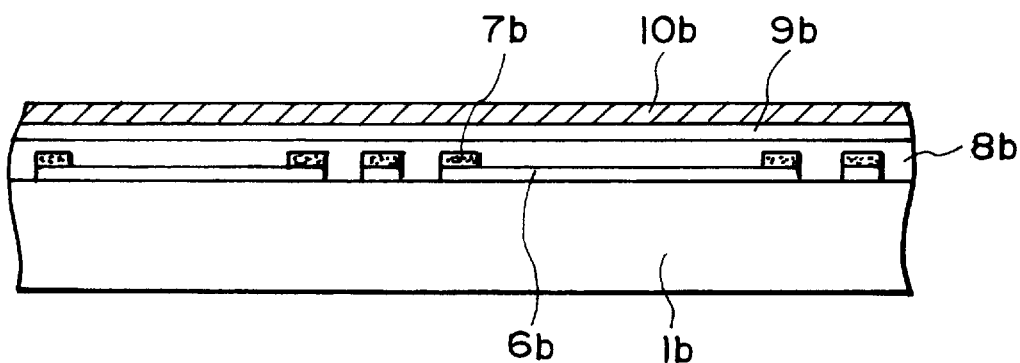
F I G. 6C

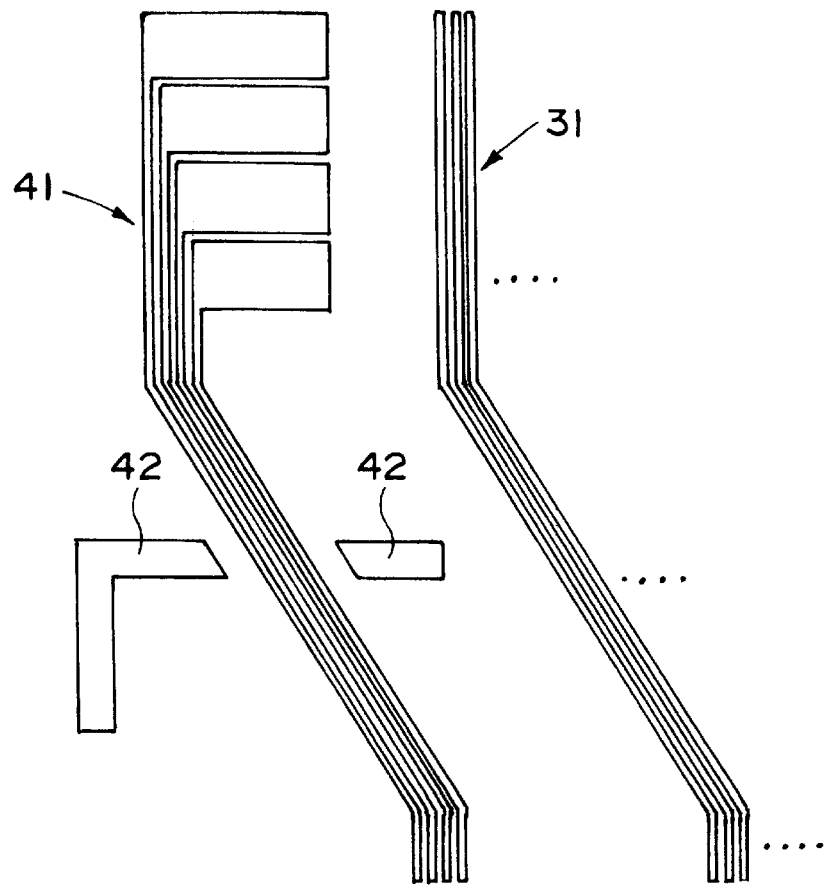
F I G. 13A
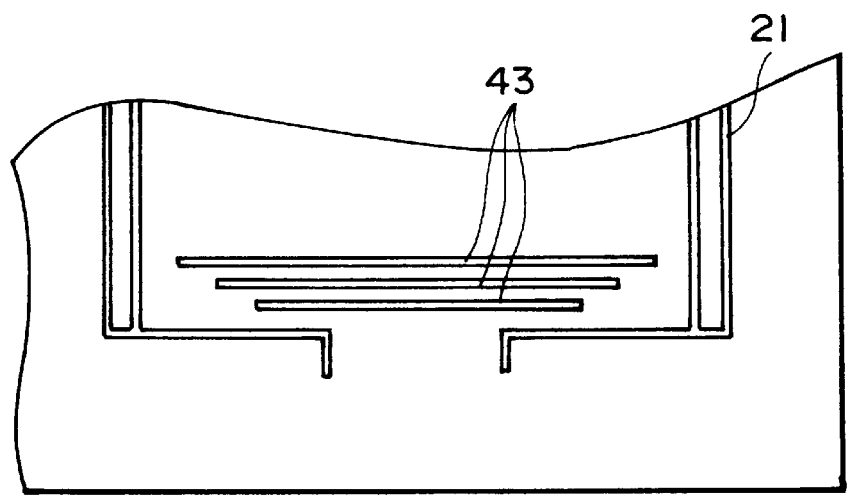
F I G. 13B

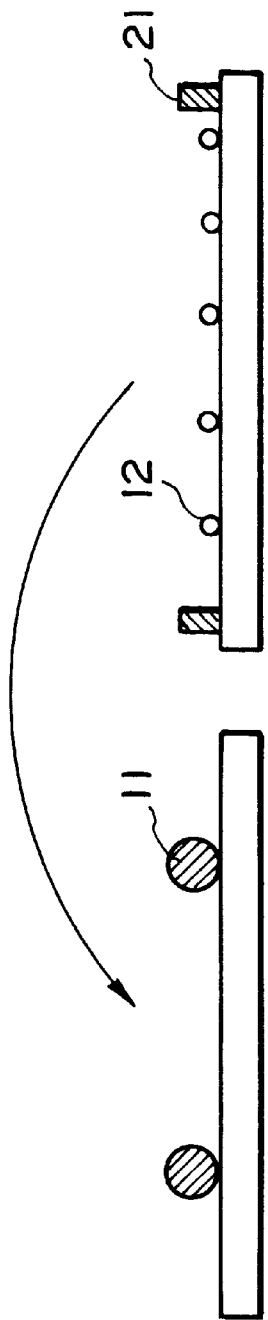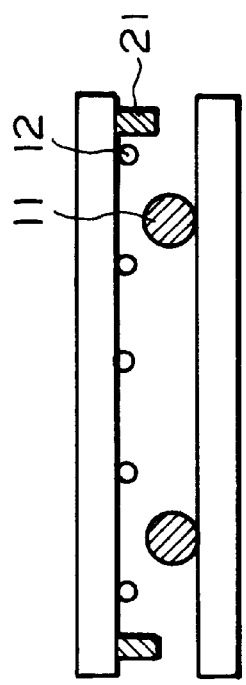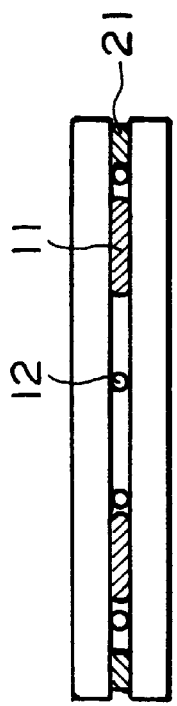

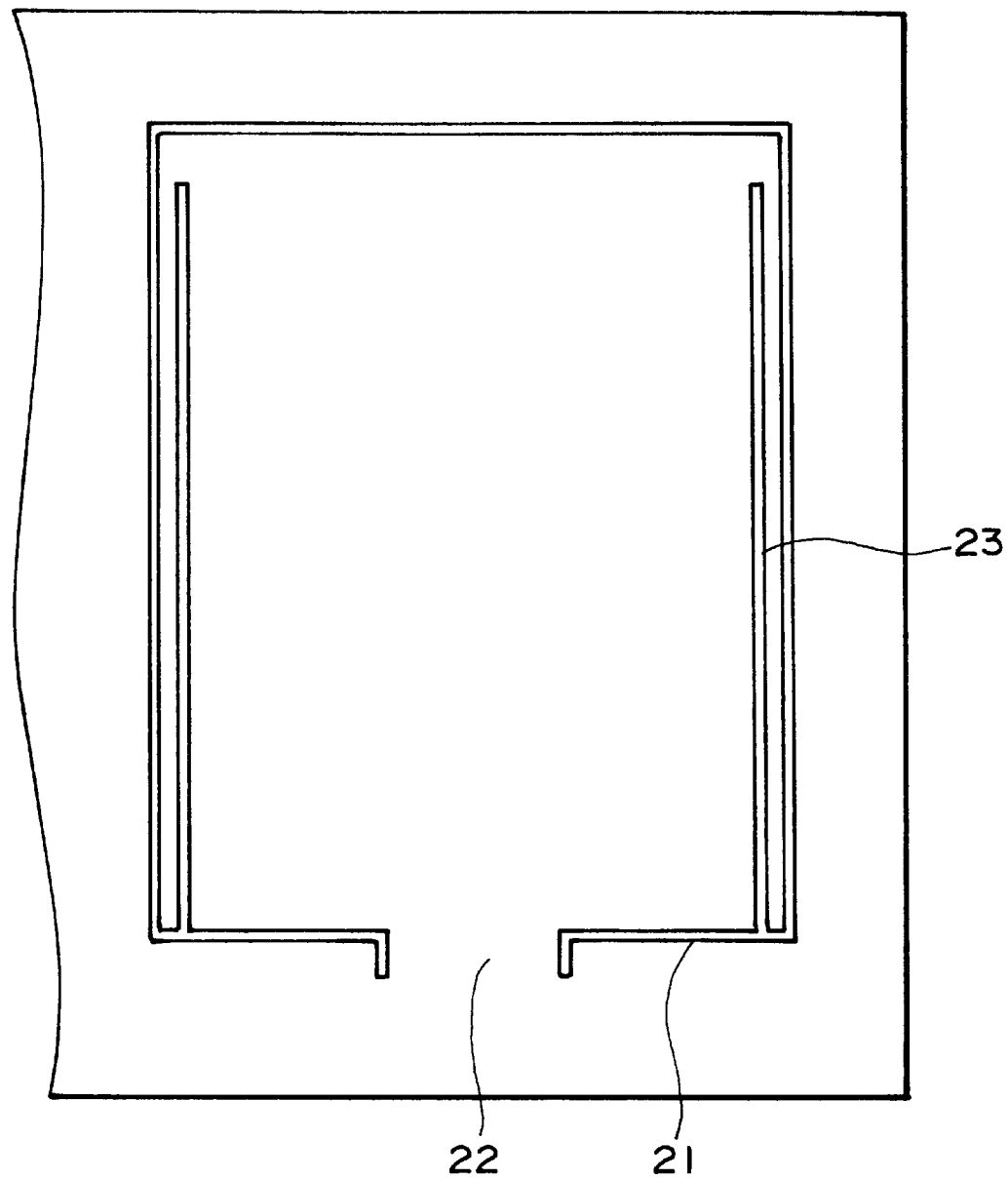
F I G. 16

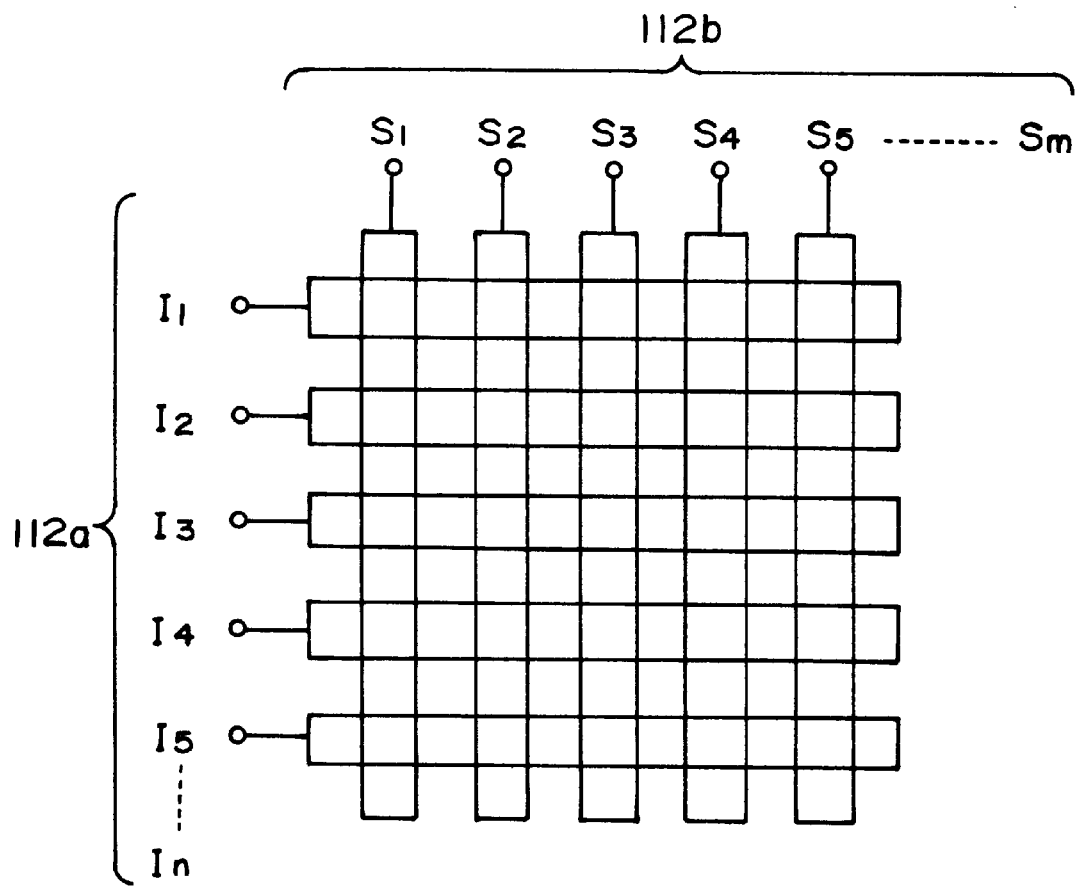
F I G. 27

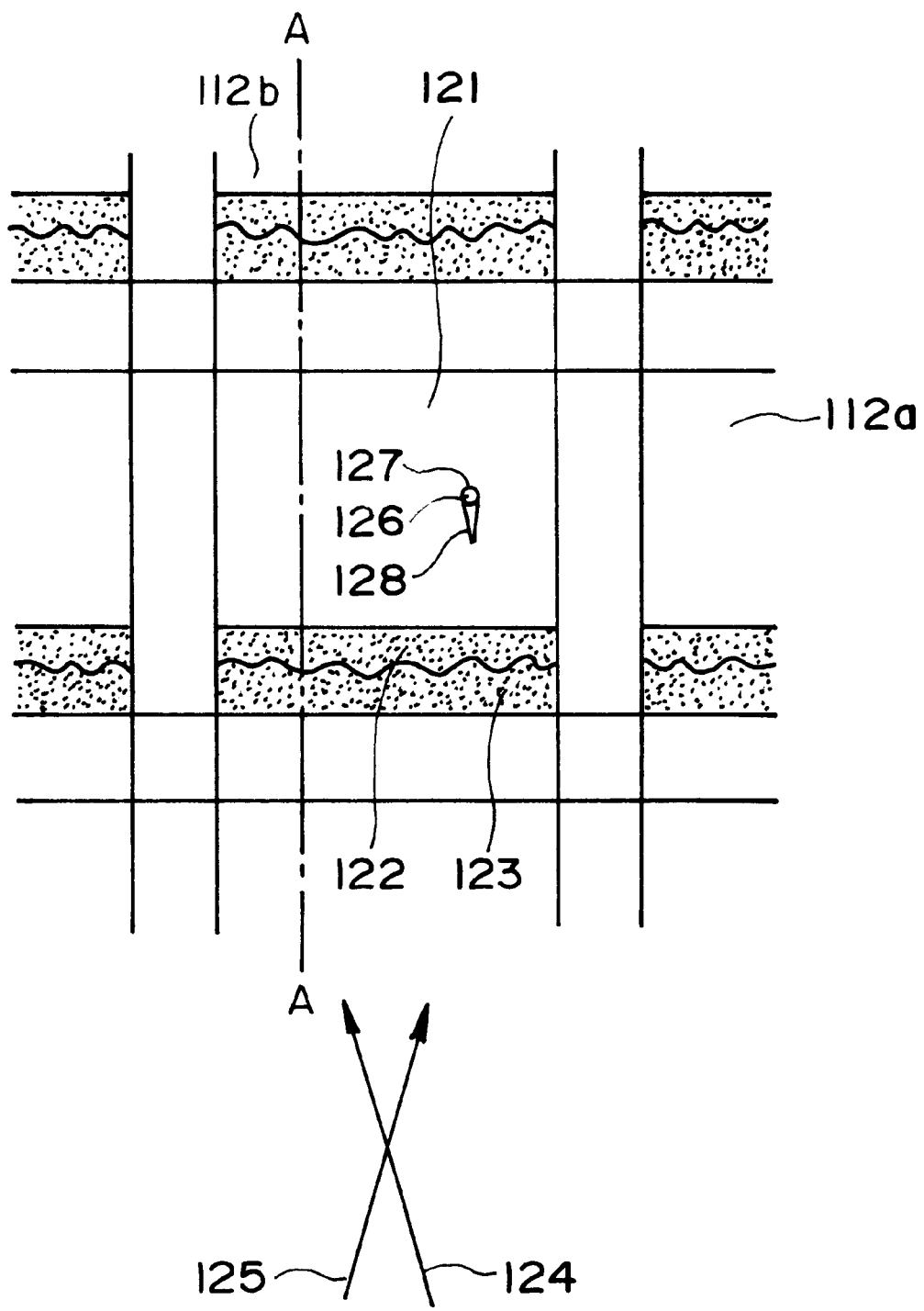
F I G. 28

LIQUID CRYSTAL DEVICE, PROCESS FOR PRODUCING SAME AND LIQUID CRYSTAL APPARATUS

FIELD OF THE INVENTION AND RELATED ART

The present invention relates to a liquid crystal device for use in, e.g., a display apparatus for displaying images including characters and/or figures, particularly a liquid crystal device using a chiral smectic liquid crystal suitable for full-color display and a liquid crystal device having a stripe electrode structure suitable for a simple matrix driving. The present invention also relates to a process for producing the liquid crystal device and a color liquid crystal display apparatus using the liquid crystal device.

A display device of the type which controls transmission of light in combination with a polarizing device by utilizing the refractive index anisotropy of ferroelectric (or chiral smectic) liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure in a certain temperature region and, in the SmC* or SmH* phase, shows a property of assuming either one of a first optically stable state and a second optically stable state (bright and dark states) responding to an electrical field applied thereto and maintaining such a state in the absence of an electrical field, namely bistability, and also has a quick responsiveness to the change in electrical field. Thus, it is expected to be utilized in a high speed and memory type display device and particularly to provide a large-area, high-resolution display based on its excellent function.

FIG. 1 shows a sectional view of a liquid crystal device using a ferroelectric liquid crystal based on two-valued (white and black) display.

Referring to FIG. 1, the liquid crystal device (panel) includes insulating substrates 1a and 1b, transparent electrodes 6a and 6b, auxiliary electrodes 7a and 7b, short-circuit prevention layers 8a and 8b, roughened surface-forming layers 9a and 9b, alignment layers 10a and 10b, an adhesive bead 11 (after adhesion), a spacer bead 12, and a liquid crystal layer 13. Each of the transparent electrodes 6a and 6b constitutes drive electrodes in combination with the auxiliary electrodes 7a and 7b, respectively. The drive electrodes (including the electrodes 6a and 7a and the electrodes 6b an 7b, respectively) intersect with each other at right angles to form a matrix electrode structure. At each intersection, one pixel is constituted and corresponds to a region between two broken lines in FIG. 1.

In order to ensure a good impact (shock) resistance and keep a uniform thickness of a liquid crystal layer, an ordinary liquid crystal panel needs to use spacer beads 12 composed of an adhesive and softer material (than the spacer beads), i.e., for effecting adhesion between the upper and lower substrate members (structures) as described above.

Such spacer beads and adhesive beads have been dispersed together on one of the pair of substrate in an ordinary (liquid crystal) panel production process (substrate production process). However, in the subsequent steps, particularly in the step of applying the pair of substrates to each other, the adhesive beads are liable to be moved due to flowability and poor adhesiveness thereof at that time, thus adversely affecting performances of a resultant liquid crystal panel.

Further, the above-mentioned liquid crystal device using a ferroelectric liquid crystal has a very small cell gap (i.e., a thickness of a ferroelectric liquid crystal layer), so that the injection of the liquid crystal into the cell gap of a blank cell is not readily performed, thus resulting in a defective liquid crystal panel in a relatively high proportion. For this reason, the ferroelectric liquid crystal device is required to improve a production yield.

There has been known a liquid crystal device including the above ferroelectric liquid crystal device having a matrix electrodes structure such that a pair of substrates (electrode plates) each provided with a group of electrodes in the form of stripes are oppositely disposed so as to form a pixel at each intersection at right angles and a gap between the substrate is filled with a liquid crystal. In case where such a liquid crystal device causes a short-circuit between the electrodes and has an electrode resistance out of its specifications, it is almost difficult to repair or replace such defective electrodes. For this reason, in an actual production line, after the formation of upper and lower electrode groups, all of the electrodes are subjected to inspection (check) with respect to short-circuit and electrode (wire) resistance by placing an inspection terminal on each lead-out portion of the electrodes, thus removing defective products from the production line.

As the number of pixels per unit display area is increased for providing a higher definition display image, an electrode width for each stripe electrode becomes narrower (smaller). Accordingly, in this case, an inspection terminal is not readily placed on a lead-out portion of an objective electrode in the above-described inspection stage, thus being liable to fail to perform a correct inspection operation.

Further, in order to reduce the electrode (wire) resistance, a metal wire (metal layer) as an auxiliary electrode is generally formed on a transparent electrode within an extent not impairing a display quality. The metal wire is liable to be damaged (e.g., burned out) by an inspection terminal having a narrowed top portion corresponding to a small electrode width or is liable to cause short-circuiting with a metal piece (fragment) scraped off or removed by the terminal.

In case where the liquid crystal device as described above is incorporated into a color liquid crystal display apparatus, a color filter comprising color filter segments of at least three colors including red (R), green (G), blue (B), and optional transparent color (W: white) in the form of stripes or a mosaic color filter wherein any adjacent (parallel) two color filter elements (comprising R, G, B and optional W segments) in one direction are shifted from each other by ½ pitch of one color filter segment in the direction may generally be used. Such a color filter is generally disposed at an inner surface of one of upper and lower (a pair of) glass substrates (i.e., on a side closer to a liquid crystal layer), whereby a resultant liquid crystal device has different layer structures with respect to the upper and lower substrates different from the case of a monochromatic (white and block) liquid crystal display apparatus.

In another aspect, a chiral smectic liquid crystal (e.g., a ferroelectric liquid crystal or an anti-ferroelectric liquid crystal) shows one orientation (alignment) state under application of an electric field of one polarity based on a certain reference potential level and shows the other orientation state under application of an electric field of the opposite polarity. Such a property is quite different from that of a twisted nematic (TN)-type liquid crystal. There has been developed a color liquid crystal display apparatus utilizing the above property of the chiral smectic liquid crystal.

The above-mentioned two orientation states of the chiral smectic liquid crystal are required to have potential energies having symmetry. However, if a pair of (upper and lower)

substrates have different layer structures thereon from each other as described above, the potential energies of the two orientation states are liable to become asymmetrical. The asymmetry of the potential energies is liable to cause that of switching threshold values between orientation state and the other orientation state.

The above problem is peculiar to the chiral smectic liquid crystal and does not substantially arise in the case of the TN liquid crystal. Particularly, the asymmetry of switching threshold values is liable to narrow (decrease) a drive margin (a margin allowing a good display state) determining a latitude in selecting drive signal waveform conditions, such as a voltage level, a pulse width and a frequency.

Accordingly, in the color liquid crystal display apparatus, it is important to find out a parameter (or factor) largely affecting the drive margin and to appropriately select and control such a parameter for providing a wider drive margin.

SUMMARY OF THE INVENTION

A first object of the present invention is to provide a liquid crystal (particularly a chiral smectic liquid crystal) device allowing a uniform liquid crystal layer thickness and a good shock (impact) resistance to retain good panel performance and improved in production yield and capable of realizing a full color display apparatus having high qualities comparable to those of a display apparatus using a cathode ray tube (CRT).

A second object of the present invention is to provide a liquid crystal device having a electrode structure capable of readily ensuring inspection (check) regarding an occurrence of short-circuit and an electrode (or wire) resistance without damaging electrodes used.

A third object of the present invention is to provide a color liquid crystal display apparatus capable of effecting good display in any operation conditions while retaining a wider drive margin.

According to the present invention, the above first object is principally accomplished by a liquid crystal device, comprising: a pair of substrates each provided with an electrode including one substrate having thereon a color filter and a coating layer, and a liquid crystal layer comprising a chiral smectic liquid crystal disposed together with spacer beads between the pair of substrates, wherein the liquid crystal layer has a thickness smaller than a diameter of the spacer beads and a maximum thickness of the coating layer, the coating layer having a pencil hardness of at most 7 H.

The above objects of the present invention are accomplished by a process for producing a liquid crystal device, comprising the steps of:

forming on a first insulating substrate a light-interrupting layer, a color filter comprising plural color filter segments, a coating layer, a barrier layer, a transparent electrode, an auxiliary electrode, a short-circuit prevention layer, a roughened surface-forming layer, and an insulating layer in succession in this order, forming on a second insulating substrate a transparent electrode, an auxiliary electrode, a short-circuit prevention layer, a roughened surface-forming layer, and an insulating layer in succession in this order, rubbing the surface of each of the insulating layers on the first and second substrates, dispersing adhesive beads over the alignment layer surface formed on the first substrate or the second substrate, disposing a sealing agent having a prescribed pattern on the insulating layer surface formed on the second substrate or the first substrate, dispersing spacer beads over the alignment layer surface provided with the sealing agent, adhesively bonding the first and second substrate to each other while fixing the first or second substrate over which the adhesive beads are dispersed, scribing the first and second substrates to remove an unnecessary portion, injecting a chiral smectic liquid crystal from an injection port into a gap between the first and second substrates, and sealing up the injection port.

According to the present invention, the above second object is principally attained by a liquid crystal device, comprising: a pair of oppositely disposed substrates each provided with a group of transparent electrodes in the form of stripes, and a liquid crystal disposed between the substrates, wherein each of the transparent electrodes partially has an auxiliary electrode in its length direction and has both lead-out end portions in a region other than a display region, each of the lead-out end portions including an exposed check portion where the auxiliary electrode is patternized so as to expose the transparent electrode.

In this case, the exposed check portions may preferably have a width larger than that of the remaining portion and are disposed alternately at every transparent electrode in their width direction.

Further, each of the exposed check portion may preferably have both end portions where the auxiliary electrode is connected so as to enclose the exposed check portion.

The device may preferably include a dummy electrode in a region other than a display region so as to form a pattern similar to those of groups of data electrodes and scanning (common) electrodes, whereby measurement of an electrode resistance is performed without adversely affecting the data and scanning electrodes.

According to the present invention, the above third object is principally achieved by a color liquid crystal display apparatus, including:

a liquid crystal device, comprising: a pair of oppositely disposed first and second substrates each provided with a group of transparent electrodes in the form of stripes, and a liquid crystal layer comprising a chiral smectic liquid crystal disposed together with spacer beads between the pair of substrates, the first substrate having thereon a color filter comprising plural color filter segments and a coating layer, wherein the transparent electrodes on the second substrate have a width smaller than that of the transparent electrodes on the first substrate, scanning signal supply means for supplying scanning signals to the transparent electrodes on the first substrate, and data signal supply means for supplying data signals including an interval at a prescribed temperature or below to the transparent electrodes on the second substrate, each of the data signals corresponding to each of color filter segments of the color filter.

The above color liquid crystal apparatus is effective in ensuring a wide drive margin and providing a good display state in any environmental conditions by appropriately setting and fixing driving conditions allowing the wide drive margin based on its structural characteristic features.

The present invention further provides a liquid crystal device, comprising: a pair of oppositely disposed substrates each provided with a group of transparent electrodes, and a liquid crystal disposed between the substrates, the groups of transparent electrodes of the pair of substrates intersect with each other to form a pixel at each intersection, wherein one of the substrates includes a light-interrupting layer for covering a part of the pixel located in a position corresponding to at least one end portion of the pixel.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5A–5E and FIGS. 6A–6C are sectional views illustrating production steps for a first substrate and a second substrate, respectively, used in an embodiment of the liquid crystal device of the invention.

FIG. 13A is a plan view of a dummy electrode pattern on a second substrate regarding an embodiment of the liquid crystal device of the invention, and FIG. 13B is a plan view of elongated projections on the second substrate in the vicinity of an injection port.

FIGS. 15A–15C are sectional views illustrating a step of applying first and second substrate to each other in the process of producing a liquid crystal device of the invention.

FIG. 16 is a plan view of a patterned sealing agent on a substrate regarding an embodiment of the liquid crystal device of the invention.

FIG. 27 is a plan view showing a matrix electrode structure adopted in an embodiment of the liquid crystal device of the invention.

FIG. 28 is a partially enlarged plan view of one pixel of an embodiment of the liquid crystal device of the invention.

DETAILED DESCRIPTION OF THE PREFERRED EMBODIMENTS

Some preferred embodiments of the present invention will be described with reference to the drawings.

Figure 2:
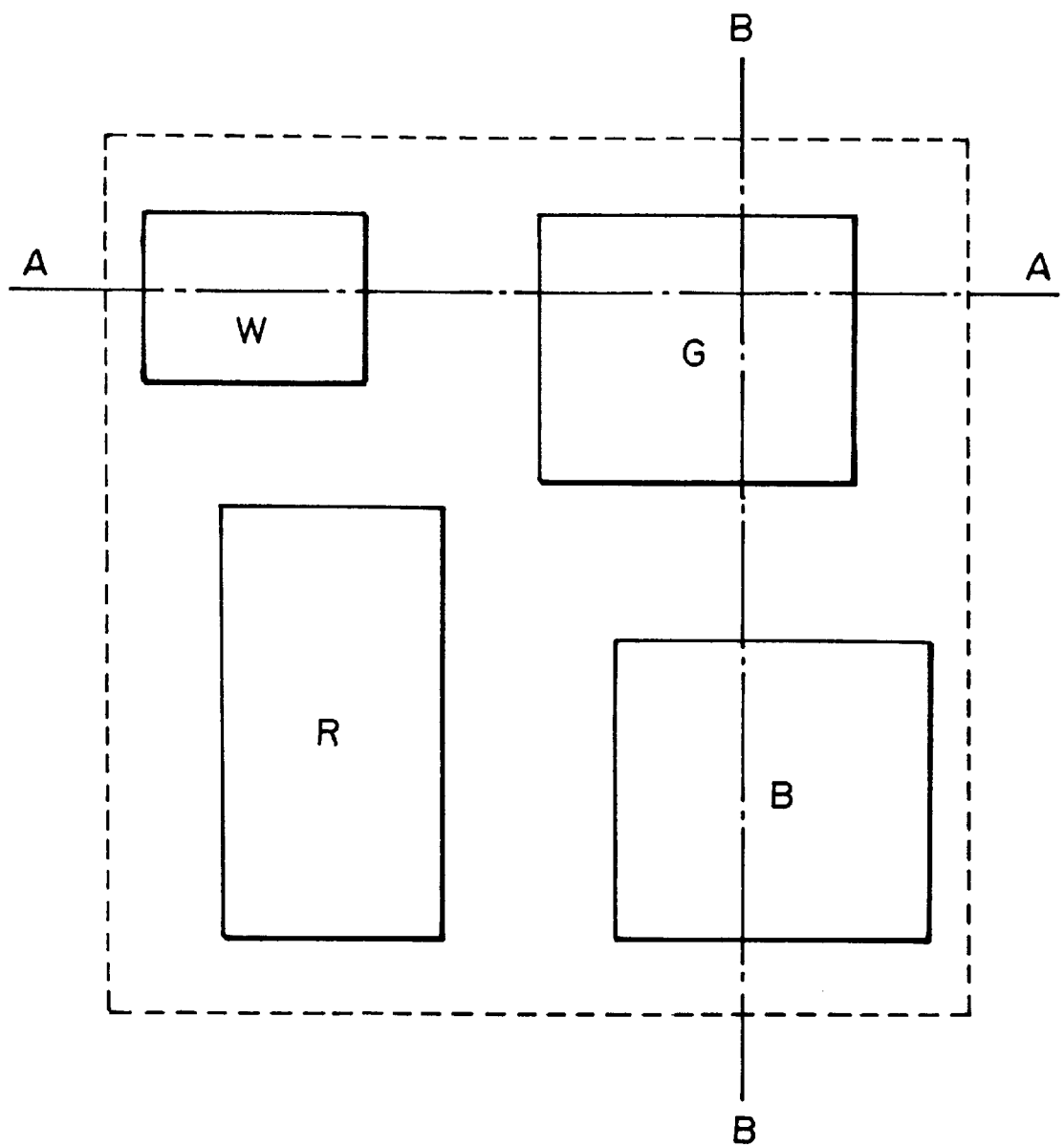
FIG. 2 is a plan view of an embodiment of the liquid crystal device according to the present invention.

FIG. 2 is a schematic sectional view of an embodiment of a pixel structure of the liquid crystal device wherein a color filter comprising color filter segments of four colors of red (R), green (G), blue (B), transparent color (W: white) is disposed according to the present invention. Referring to FIG. 2, a region enclosed by broken (dotted) lines is a (one) pixel.

Figure 3:
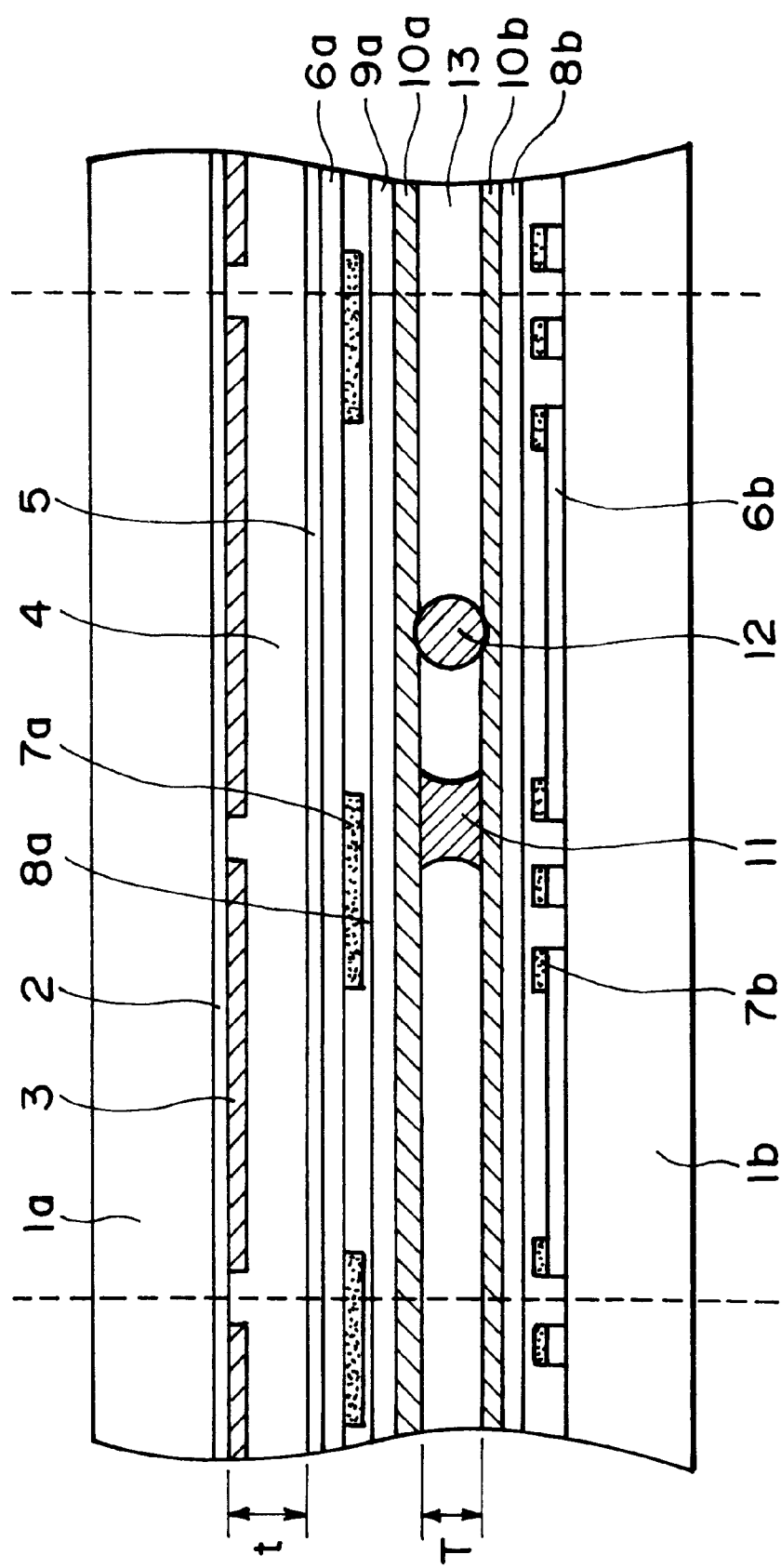
FIGS. 3 and 4 are sectional views of the liquid crystal device taken along A—A line and B—B line in FIG. 1, respectively.
Figure 4:
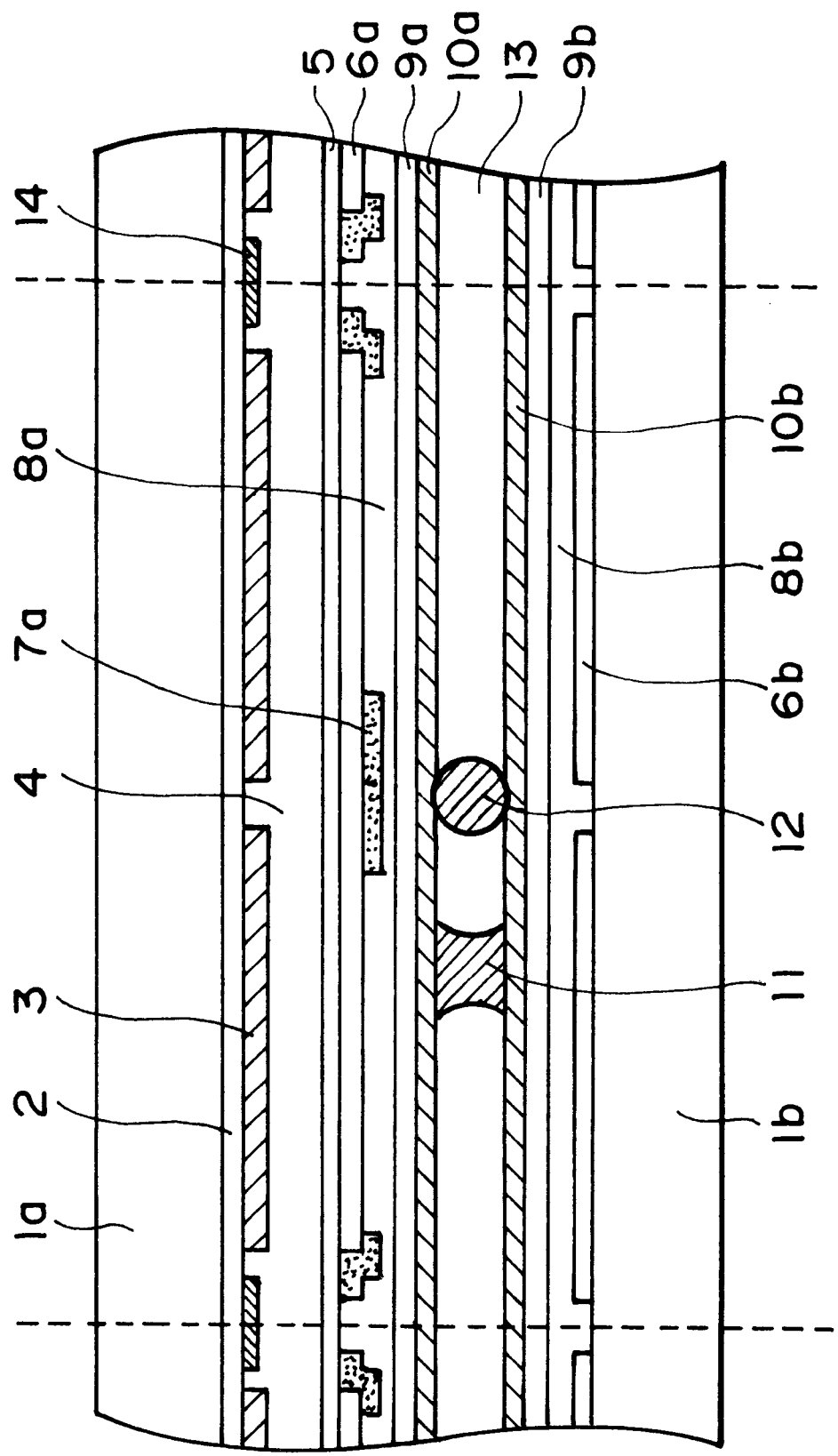
Figure 5A:
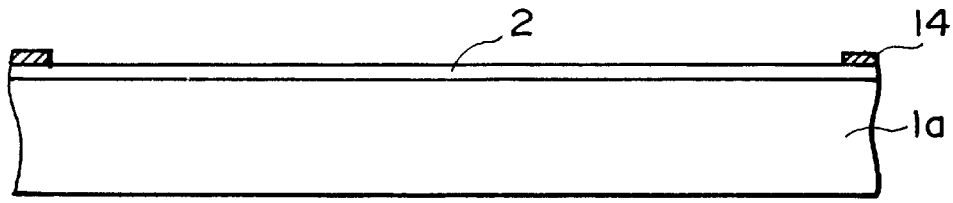
Figure 5B:
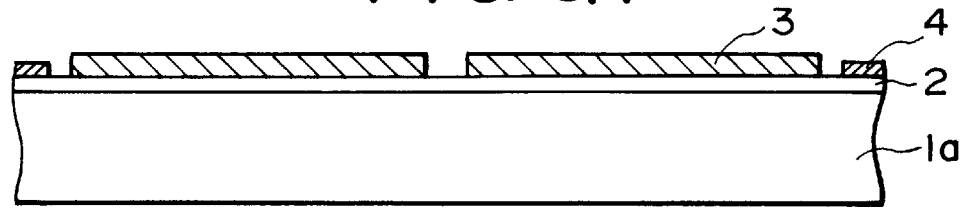
Figure 5C:
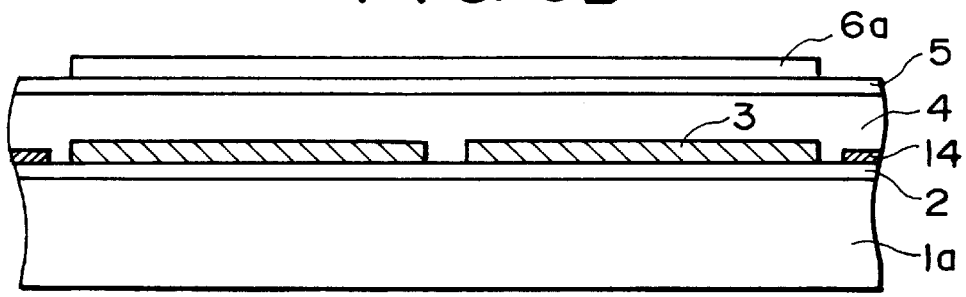
Figure 5D:
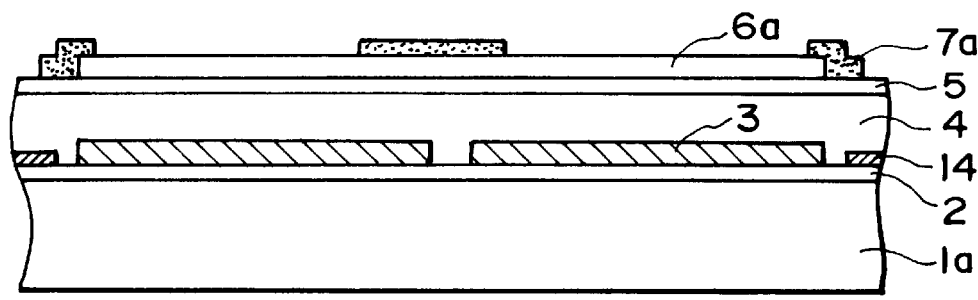
Figure 5E:
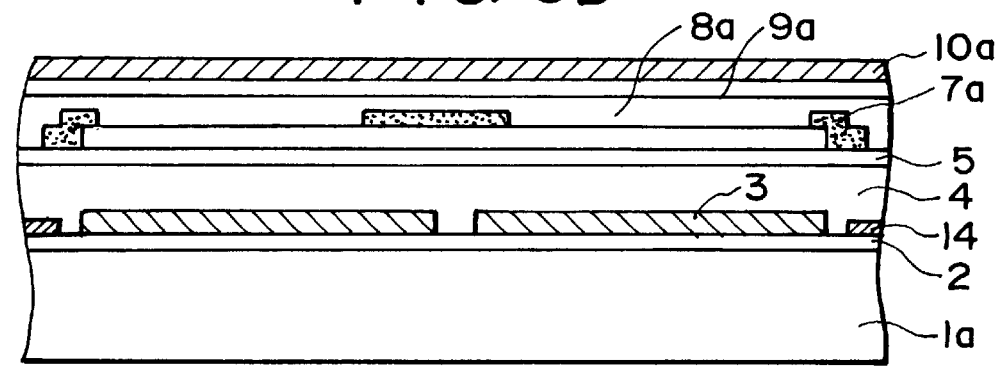

FIG. 3 is a schematic sectional view of the pixel structure taken along A—A line in FIG. 2, and FIG. 4 is a schematic sectional view of the pixel structure taken along B—B line in FIG. 2. Referring to FIGS. 3 and 4, regions between respective two broken lines are respectively a (one) pixel.

In FIG. 3 and/or FIG. 4, the liquid crystal device having the pixel structure includes insulating substrates 1a and 1b, an undercoat layer 2, a color filter 3 having a prescribed pattern (shown in FIG. 2), a coating layer 4 having a maximum thickness (t) for providing the color filter with an even (flat) coated surface, a barrier layer 5, transparent electrodes 6a and 6b, auxiliary electrodes 7a and 7b, short-circuit prevention layers 8a and 8b, roughened surface-forming layers 9a and 9b, alignment layers 10a and 10b, an adhesive bead 11 (after adhesion), a spacer bead 12, and a liquid crystal layer 13 having a thickness (T), and a light-interrupting layer 14.

In FIGS. 3 and 4, an upper substrate (having the color filter 3) is referred herein to as a "first substrate" and a lower substrate is referred herein to as a "second substrate" for convenience. Incidentally, FIG. 2 is a plan view viewed from the outside of a first substrate. Further, the liquid crystal device may be viewed from the first substrate side or the second substrate side but may preferably be viewed from the first substrate side (having the color filter 3).

Hereinbelow, a preferred embodiment of the process for producing a liquid crystal device (as shown in FIGS. 3 and 4) will be described along production step (steps a–t) while making reference to FIGS. 5–16.

First, production steps of structural members (elements) formed on a first substrate are explained.

Step-a (FIG. 5A):

An insulating substrate 1a may generally be a transparent substrate available as a glass for a liquid crystal device, such as sheet (or plate 9glass or non-alkali glass. The insulating substrate 1a may preferably have a polished (abrasion) surface on either one side.

The insulating substrate 1a may have appropriate thickness and size in view of picture area and production efficiency (e.g., in such a respect that how many display panels can be prepared by one production operation). For example, in a production of a large-area (14.8 inch) liquid crystal device, the insulating substrate may preferably have a thickness of 1.1 mm.

Step-b (FIG. 5A):

On the above insulating substrate 1a, an undercoat layer 2 may preferably formed to prevent isolation (or elimination) of alkali from a glass during and after the device production process. The undercoat layer 2 may function as a protective layer for the insulating substrate 1a and, e.g., comprises $SiO_2$, MgO, SiN, $TiO_2$, $Al_2O_3$ and ZnO. The undercoat layer 2 may generally have a thickness of 20–1000 Å.

Step-c (FIG. 5A):

The insulating substrate 1a having thereon the undercoat layer 2 is subjected to washing (cleaning) and drying, followed by ultraviolet-light irradiation to remove an organic substance. The washing operation may be performed an appropriate time by using at least one means of pure water shower, ultrasonic cleaning with pure water, brush, etc. These means may be used singly or in combination of two or more means.

Figure 7:
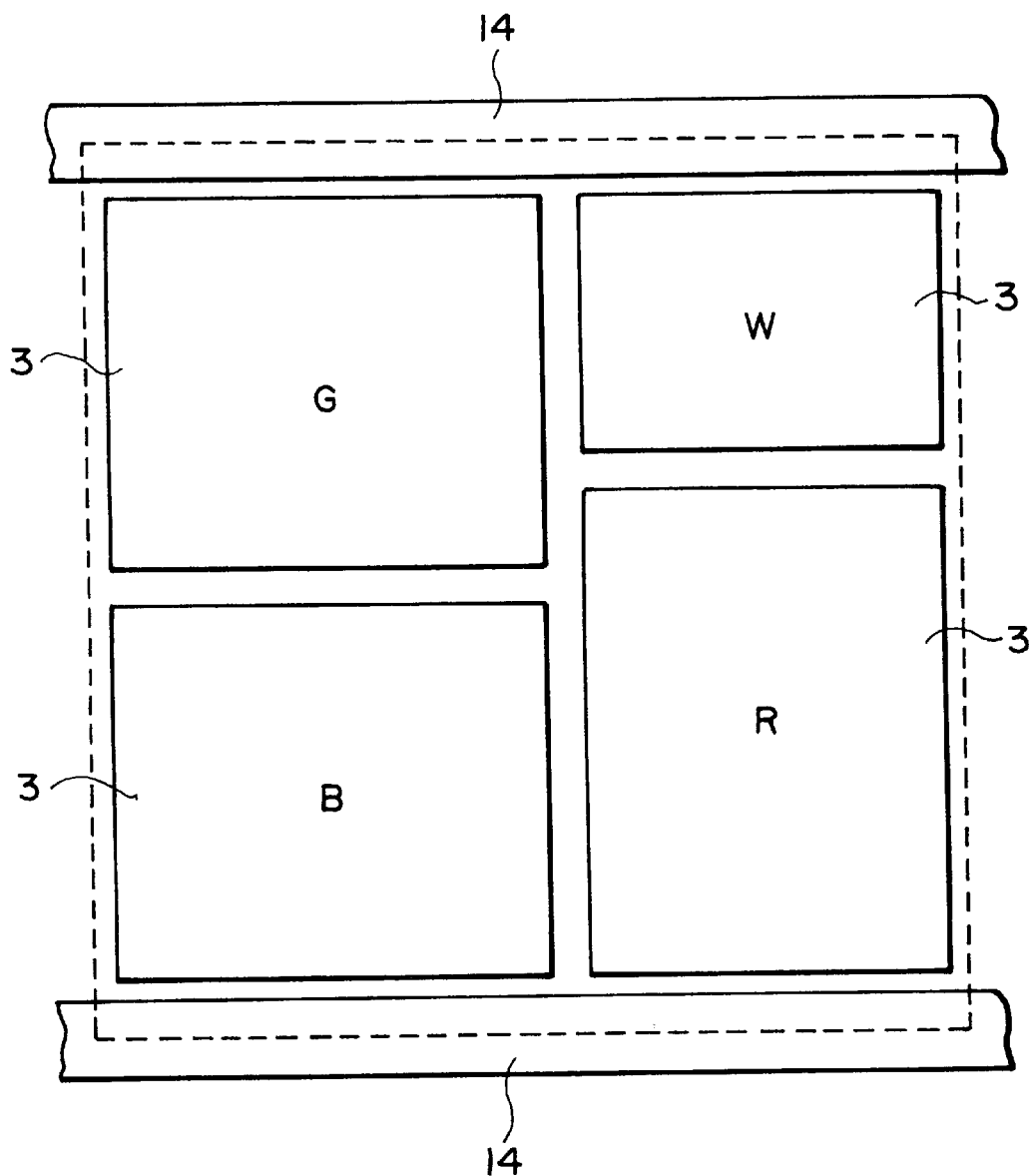
FIG. 7 is a plan view of a first substrate having thereon a color filter and a light-interrupting layer as to an embodiment of the liquid crystal device of the invention.

Step-d (FIG. 5A):

On the undercoat layer 2, a light-interrupting layer 14 (as also shown in FIG. 7) is partially formed in a pattern of stripes (black stripes). The pattern may be other desired forms, such as black matrix pattern. The light-interrupting layer 14 may generally be composed of a material excellent in light-interrupting properties, including: metals and alloys, such as Cr, Mo and alloys of these metals; metal oxides, such as $Cr_2O_3$; and pigment-containing organic resin, such as a resin containing a black pigment. The light-interrupting layer 14 may generally have a thickness of 500–1500 Å in view of light-interrupting ability of a material used. For example, the light-interrupting layer 14 composed of metal provides a sufficient light-interrupting effect even if the layer in thin. In the present invention, a Mo-Ta alloy layer having a thickness of at most 1000 Å may preferably be used as the light-interrupting layer 14.

The light-interrupting layer 14 may be formed on the entire surface of the undercoat layer 2 by sputtering or coating, followed by photolithographic (photo etching) process to be formed in a prescribed pattern. More specifically, a resist selected in view of adhesiveness to a material for the light-interrupting layer 14 is applied onto the light-interrupting layer surface by, e.g., spinner coating or printing and pre-baked at 70–120° C., followed by exposure to light (90–120 m), development, washing and drying. The resultant substrate is then etched with an etchant (e.g., acids selected depending on the material used), followed by washing, peeling-off of the above resist, and further washing.

Incidentally, the light-interrupting layer 14 is formed so as to extend to a region not related to display in the vicinity of a sealing agent (appearing hereinafter) to somewhat leave a non-light interrupting portion (i.e., light transmission portion) which can be subjected to observation of an alignment state of a liquid crystal after forming the device.

Step-e (FIG. 5B):

On the undercoat layer 2, a color filter (film) 3 comprising color filter segments of at least three colors (preferably four colors) of red (R), green (G), blue (B) and white (W, transparent color) is formed in a prescribed pattern. A method of forming the color filter 3 may include dyeing, pigment dispersion method and electrodeposition. For example, the pigment dispersion method is performed as follows.

A desired color resist (resin layer) comprising a photosensitive resin (preferably polyamide) containing a prescribed color pigment (containing no pigment for W) is applied onto the undercoat layer 2 by using a spinner or a coater to provide a thickness of 1.0–2.0 μm, followed by leveling at a prescribed temperature and pre-baking at about 80° C. At this time, conditions therefor, such as treatment temperature, treatment time, and a layer thickness may appropriately be controlled depending on resist materials. The thus treated color resist layer is exposed to light (ultraviolet light, 200–1000 mJ). At this time, the exposure time may appropriately be changed depending on materials for R, G, B and W since the respective materials shows different sensitivities. After the exposure operation, the resultant resist layer is subjected to development wherein a developer, a developing method, and a developing temperature may appropriately be selected depending on the resist material, followed by post-baking at 120–250° C. and washing.

The respective color filter segments may be formed in a pattern as shown in FIG. 7 such that the respective color filter segments are separated from each other with a spacing of several microns. The entire color filter 3 is disposed so as not to make contact with the light-interrupting layer 14 and a sealing agent (appearing hereinafter) is not only a display region (where display is performed) but also a peripheral (non-display) region other than the display region (where display is not performed). The respective color filter segments having identical color formed in the display region and the peripheral (non-display) region may have identical size (dot size) or different sizes but may preferably have a dot size in the peripheral region larger than that in the display region.

The above color filter-forming step is performed with respect to respective color filter segments in succession. The order of formation may appropriately be determined depending on the resist materials used.

Step-f (FIG. 5C):

A coating layer 4 for filling an unevenness between adjacent color filters and providing a flat surface is formed on the color filter (film) 3 and the light-interrupting layer 14. More specifically, a coating liquid containing a coating material is applied onto the surface of the color filter 3, the light-interrupting layer 14, and a part of the undercoat layer 2 by using a spinner, a coater or according to printing process, followed by leveling at 60–150° C. and optional post-baking at 150–330° C., as desired, to form a coating layer having a maximum thickness (t in FIG. 3) of 1.5–5 μm. The above treatment temperature may appropriately be changed depending on the coating material used. The coating material may be an organic substance or an inorganic substance as long as it has a heat-resistance and a chemical resistance sufficient to withstand the subsequent steps. The coating material may preferably have an appropriate softness. Examples of the coating material may preferably include polyamide, epoxy resin, and organic silane-based resin, particularly organic silane-based resin.

The coating layer 4 has a hardness (pencil hardness as measured by using a pencil hardness measurement apparatus according to JIS-K5401) of at most 7 H, preferably 3 H to 7 H. The coating layer 4 may preferably be formed so as to extend to a portion on which sealing agent is disposed and particularly an injection port (of a liquid crystal) is formed, thus allowing an easy injection operation (of a liquid crystal) thereby to prevent an occurrence of defective device due to injection failure. The coating layer may be formed on the second substrate.

The resultant liquid crystal device produced through the process according to the present invention is characterized by a (soft) coating layer 4 having a hardness of at most 7 H and a liquid crystal layer 13 having a thickness (T in FIG. 3, e.g., 0.5–3 μm) smaller than the maximum thickness (t) of the coating layer (i.e., T<t), so that injection of a liquid crystal into a gap (particularly a small cell gap as in the ferroelectric liquid crystal device) becomes easy, thus lowering a void-occurrence rate at that time and also even after low-temperature storage. Consequently, a production yield is improved. The condition of T<t is effective in enhancing a smooth injection performance. The thickness (T) of the liquid crystal layer is also smaller than a diameter of a spacer bead 12. In other words, the spacer bead 12 is partially embedded and fixed in opposite alignment layers 10a and 10b, thus ensuring a uniform cell gap between the first and second substrates. The embedding of the spacer bead 12 is readily performed by forming a coating layer 4 having a pencil hardness of at most 7 H (preferably 3 H–7 H).

Step-g (FIG. 5C):

On the surface of the coating layer 4, a barrier layer 5 for protecting the coating layer 4 and the color filter 3 in the subsequent steps (particularly including etching process). The barrier layer 5 may preferably comprise $SiO_2$, MgO, SiN, $TiO_2$, $Al_2O_3$ and ZrO and may generally be formed in a thickness of, e.g., 100–1000 Å by printing or sputtering in view of the material used.

Up to the above Step-g, a part of the production process of the present invention adopted in only the first substrate is described. Hereinbelow, Steps-h to t are adopted in not only the first substrate but also the second substrate. Incidentally, an insulating substrate 1b (the second substrate) may generally comprise a material identical to that of the insulating substrate 1a (the first substrate) mentioned above.

Step-h (FIGS. 5C and 6A):

Transparent electrodes 6a and 6b each comprising a layer of a transparent electroconductive material, such as indium tin oxide (ITO) are formed on the barrier layer 5 (on the first substrate side) and the insulating substrate 1b (on the second substrate side), respectively, by sputtering, vapor-deposition, baking, etc. The transparent electroconductive material may preferably be $In_2O_3$ doped with 5–10% $SnO_2$ but may appropriately be selected from other materials in view of transmittance and electroconductivity. The transparent electrodes 6a and 6b may generally have a thickness of 300–3000 Å but may have an appropriate thickness in view of optical properties of a liquid crystal and a resistance thereof. The transparent electrodes (6a, 6b) (e.g., ITO layers) are formed in prescribed patterns, respectively, through a photolithographic (or photo etching) process similarly as in the case of the light-interrupting layer 14. An etchant used in the above process may preferably include an aqueous (mixture) solution of ferric chloride, hydriodic acid, and hydrophosphorus acid (which may be used singly or in combination of two or more species).

Figure 9:
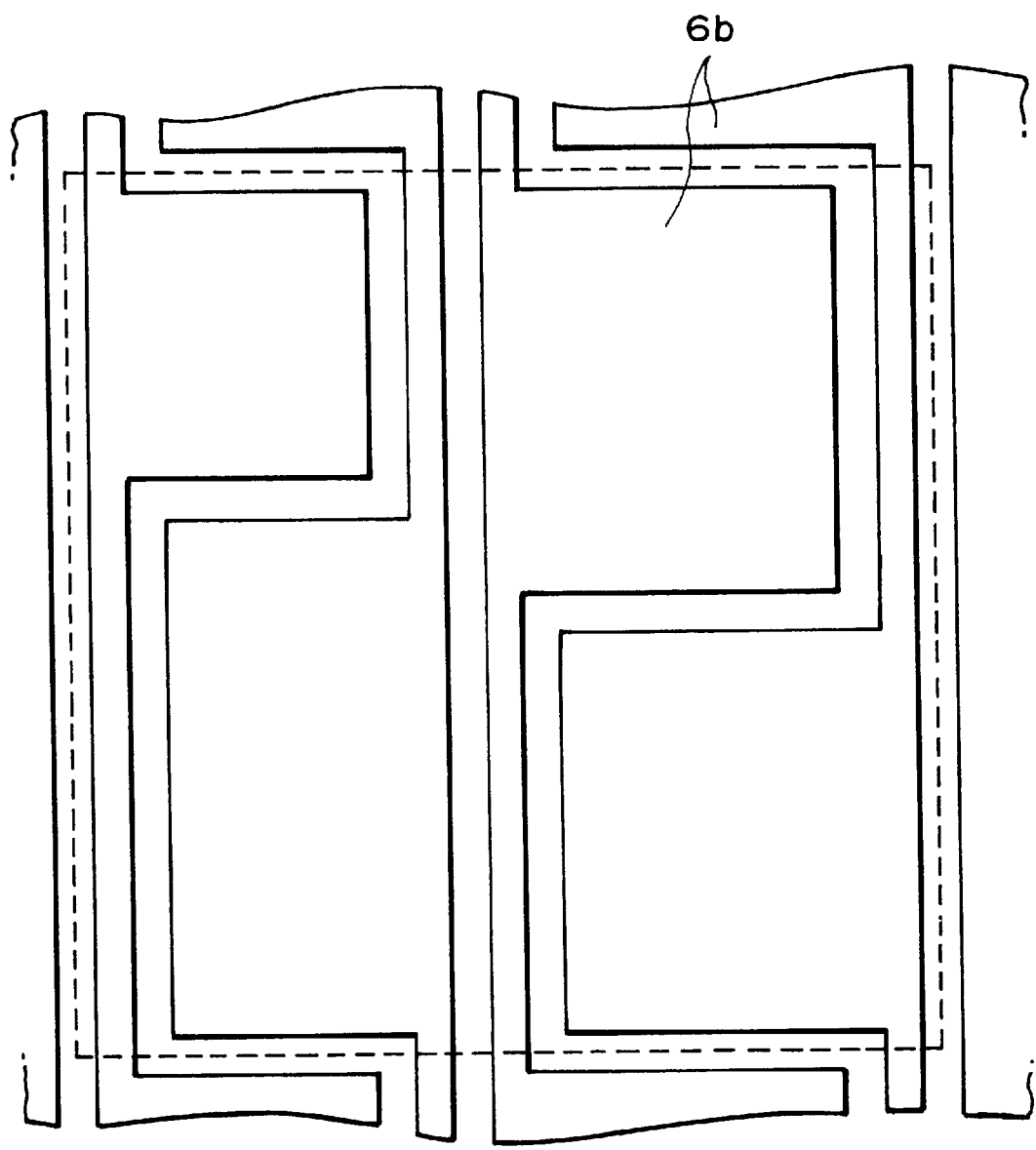
FIG. 9 is a plan view showing a transparent electrode formed on a second substrate as to an embodiment of the liquid crystal device of the invention.

The pattern of the electrode 6a (on the first substrate side) may correspond to display pixels and may preferably be stripes each of which is disposed between the light-interrupting layers 14 as shown in FIG. 7. On the other hand, the pattern of the electrode 6b (on the second substrate side) may preferably correspond to the opposite color filter pattern as shown in FIG. 9.

The pattern of the electrode 6a (on the first substrate side) may preferably cover the entire color filter 3 disposed in the display region and the peripheral region.

In this step, by forming electrodes (as dummy electrodes) in the peripheral region other than the display region, it is possible to measure an electrode resistance without adversely affecting drive electrodes. FIG. 13A shows a group of dummy electrodes 41 separated from a group of drive electrodes 31 formed on the second substrate. Similarly, on the first substrate, such dummy electrodes are formed. Each of the electrodes 41 and 31 may comprise a material identical to that of transparent electrodes (6a, 6b). Referring to FIG. 13a, L-shaped elongated projections 42 are formed so as to dam up the flow of solutions (or liquids) used in the subsequent steps toward the outside the device, thus allowing a desired layer formation. FIG. 13B shows a part of a substrate (preferably the second substrate) in the vicinity of an injection port formed by a sealing agent 21 wherein plural elongated projections 43 are formed in a pattern such that respective elongated projections 43 are disposed in parallel with each other with an identical spacing but have different lengths gradually decreasing toward the injection port. The elongated projections 43 are effective in allowing uniform an easy injection of a liquid crystal.

The above elongated projections 42 and 43 may preferably comprise a material (preferably ITO) identical to that of the transparent electrodes 6a and 6b since these structural members 42, 43, 6a and 6b of the device can be formed at the same time to simplify the production process of the device.

Step-i (FIGS. 5D and 6B):

On parts of the transparent electrodes 6a and 6b, auxiliary electrodes 7a and 7b in order to reduce electrode resistances thereof (6a, 6b) are formed, respectively. The auxiliary electrodes (7a, 7b) may comprise metals or metal alloys, such as Cr, Al, Mo, alloys of these metals, and Mo-Ta. In order to improve adhesiveness to the transparent electrodes (6a, 6b) and a photoresist used and to provide an appropriate resistance. The respective auxiliary electrodes (7a, 7b) may each have a lamination structure (upper lower/lower layer), such as Mo/Al, Mo/Al/Mo-Ta or Mo-Ta/Al/Mo-Ta. In the case of using the lamination structure, the layer structure may preferably be determined depending on compatibility of the material used with an etchant used. In such a respect, the lamination layer structure may more preferably be Mo-Ta (5–10%, e.g., 200–500 Å thick)/Al alloy (with, e.g., Si or Cu) (e.g., 200–1500 Å thick)/Mo-Ta (10–20%, e.g., 100–500 Å thick) lamination layer having a (total) thickness of 500–2500 Å formed at the same time. The above lamination layer may be formed layer by layer while performing etching with respect to respective layers.

Figure 8:
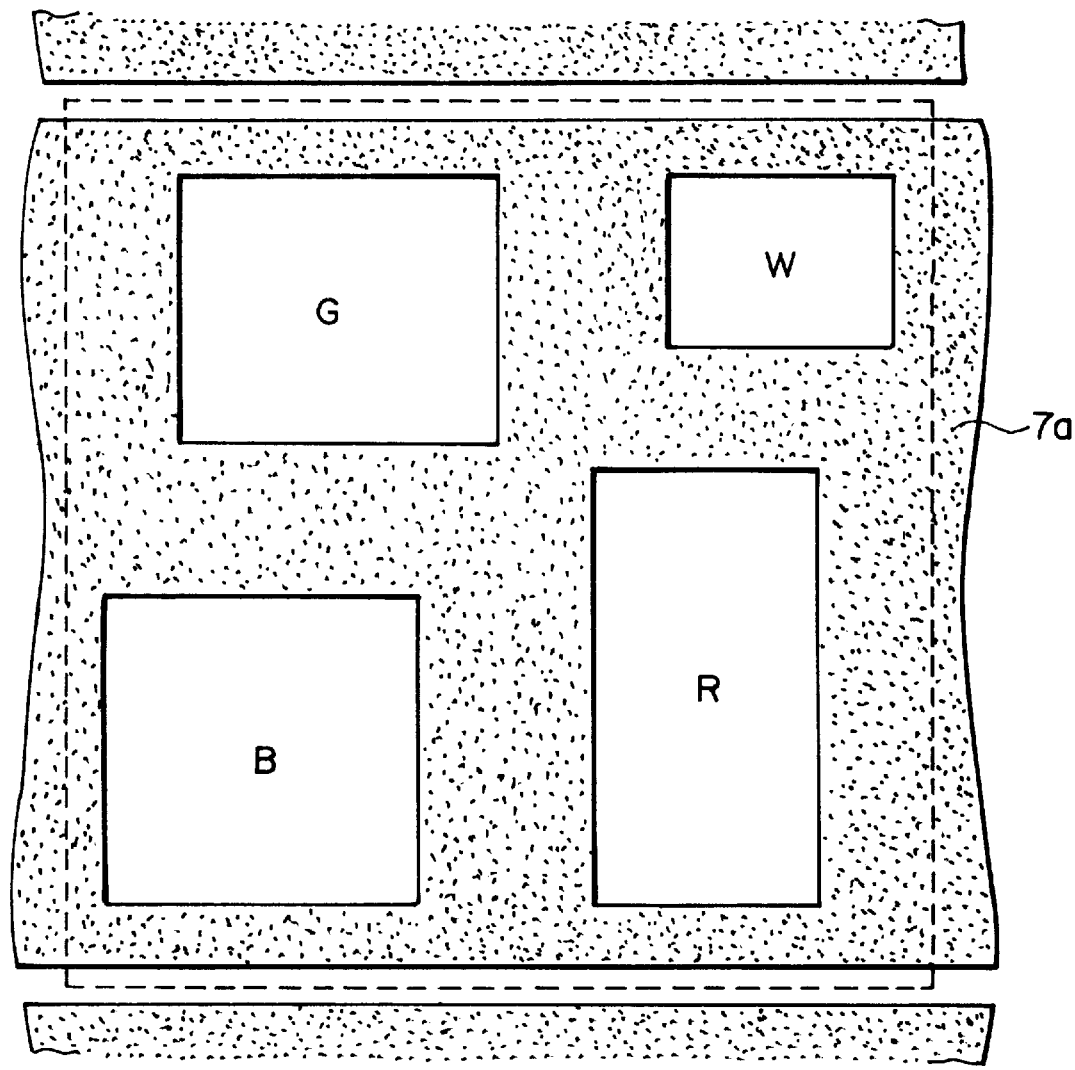
FIGS. 8 and 10 are plan views showing auxiliary electrodes on first and second substrates, respectively, as to an embodiment of the liquid crystal device of the invention.
Figure 10:
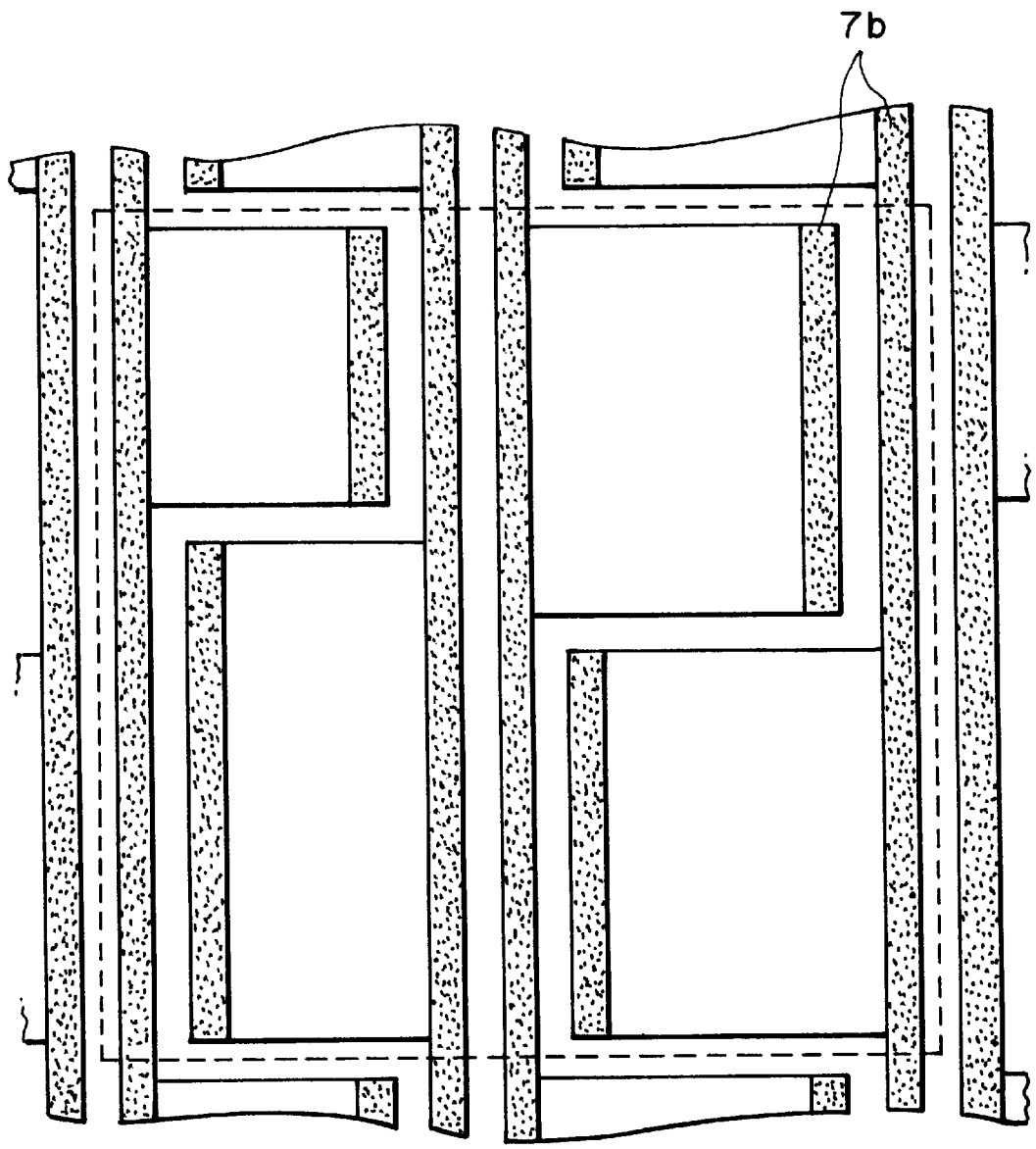

The above material layer for forming the auxiliary electrodes (7a, 7b) is formed on the entire surface of the immediately lower layers on the first and second substrates and subjected to a photoetching process (including the steps of resist application-exposure-development-post baking-etching-peeling off of resist) to form an auxiliary electrode 7a having a pattern such that the electrode 7a has openings located over the respective color filter segments (R, G, B, W) as shown in FIG. 8 and to form an auxiliary electrode 7b having a pattern such that the electrode 7b is disposed on both end portions of the transparent electrode 6b as shown in FIG. 10. The auxiliary electrodes 7a and 7b may preferably be formed on the entire surface of the transparent electrodes 6a and 6b in the peripheral region other than the display region.

In a region other than the display region preferably outside the device, respective drive electrodes (as shown by reference numerals 31 and 32 in FIGS. 11 and 12) each have an exposed check portion at at least one lead-out end section (preferably both lead-out end sections) thereof.

Figure 11:
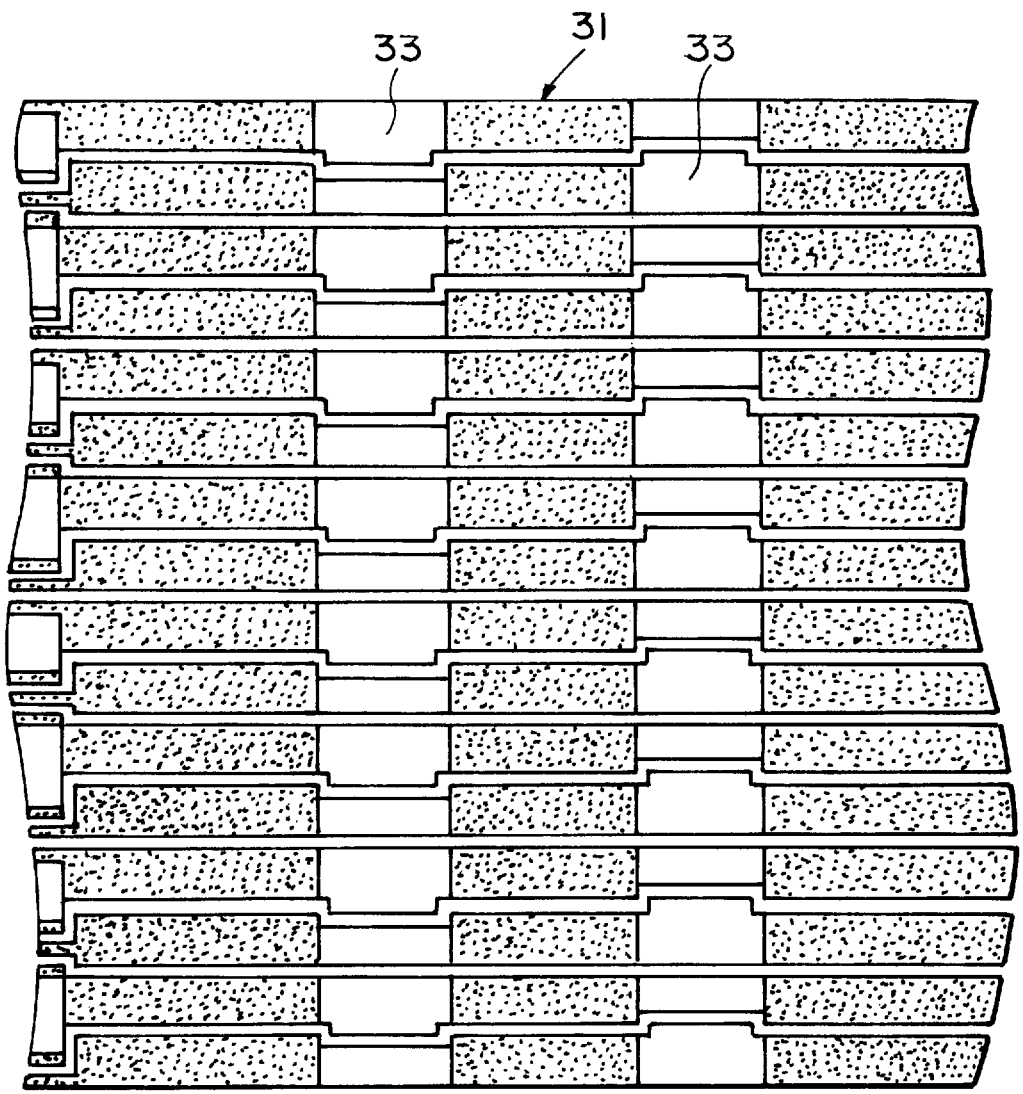
FIGS. 11 and 12 are plan views of plural exposed check portions of transparent electrodes on second and first substrate sides, respectively, of an embodiment of the liquid crystal device of the invention.

FIG. 11 shows one lead-out end section of a group of drive electrodes 31 (comprising the electrodes 6b and 7b on the second substrate) each of which has an exposed check (or inspection) portion 33 for inspection of short-circuit (a portion at which the transparent electrode 6b is not coated with the auxiliary electrode 7b (which ordinary covers the entire transparent electrode 6b in this portion) to expose the transparent electrode 6 surface in a prescribed region, e.g., a region separating the auxiliary electrode 7b portion (dotted portion in FIG. 11) from each other in its length direction). The exposed check portion may be patternized in various forms (e.g., in view of a check terminal form) for checking short-circuit. At the other lead-out end section of the drive electrodes 31, the exposed check portions are provided similarly as in the above case.

Figure 12:
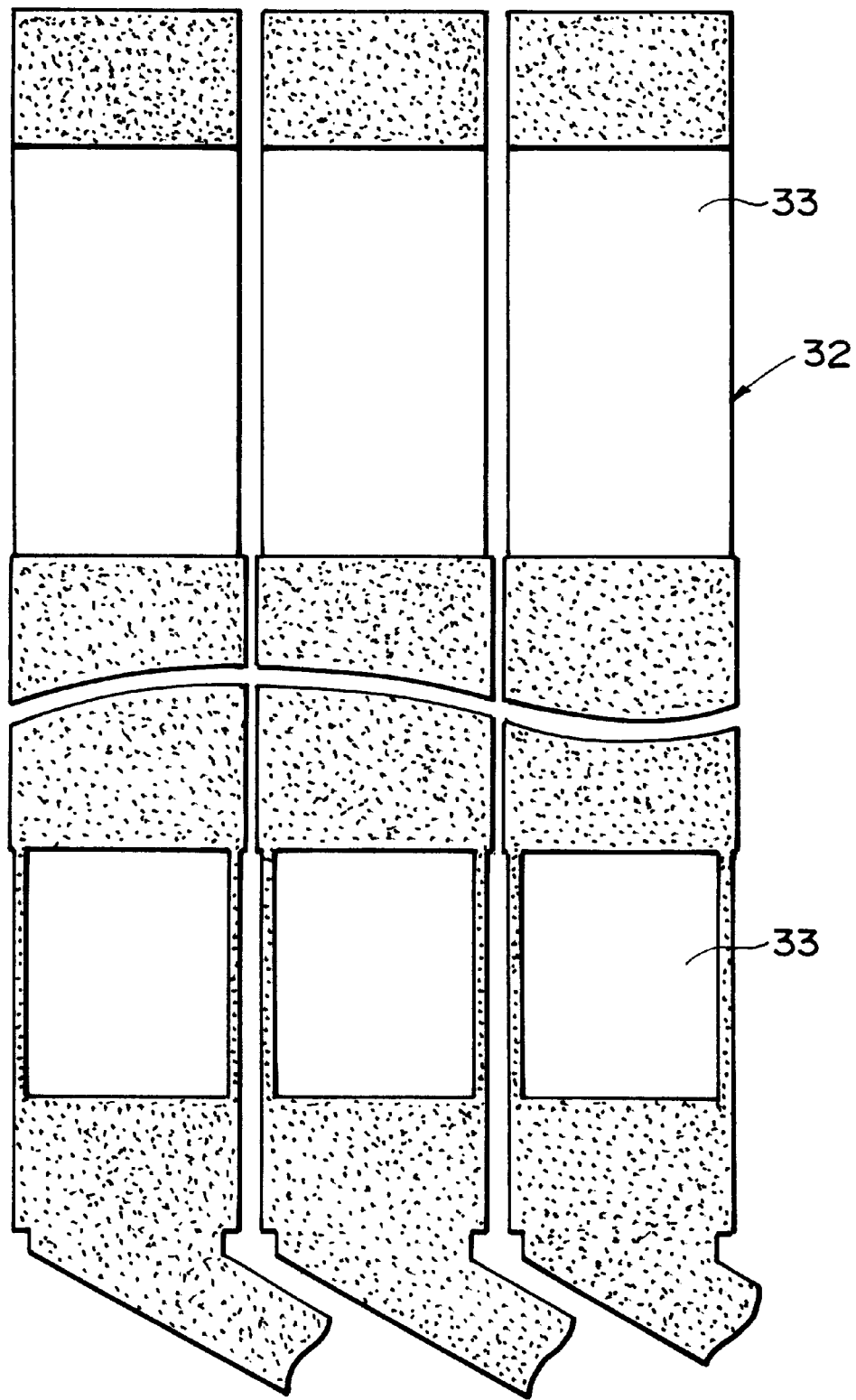

FIG. 12 shows one lead-out end section (preferably present in the sealing area enclosed by the sealing agent) of a group of drive electrodes 32 (comprising the electrodes 6a and 7a on the first substrate) each of which has an exposed check portion similarly as in those of FIG. 11. At the other lead-out end section of the drive electrodes 32, the similar electrode structure may be adopted.

The respective drive electrodes 31 and 32 are very thin an narrow layers (films), so that a terminal for short-circuit inspection (check terminal) is correspondingly small and may generally have a form of a fine needle, thus being liable to damage the drive electrodes 31 and 32. Particularly, on the drive electrode 31 having a very narrow width, the check terminal per se is not readily placed on a desired position in some cases.

In view of the above difficulties, in the present invention, by providing the drive electrodes with the exposed check portion composed of, e.g., ITO transparent electrode harder than the material (metal) of the auxiliary electrode as shown in FIGS. 11 and 12, it is possible to prevent the drive electrodes 31 an 32 from being damaged or marred. Further, as shown in FIG. 11, on the particularly fine drive electrodes 31, somewhat wider exposed check portions 33 are disposed alternately at every drive electrode 31 in a direction (width direction) perpendicular to the length direction of the electrodes 31, thus allowing the check terminal to be readily placed thereon. In this case, any adjacent portion between two check portions 33 in the width direction has a smaller width than the check portion but may preferably expose the transparent electrode thereat (i.e., the auxiliary electrode is removed) as shown in FIG. 11. This is because, if the check terminal is placed on a position different from an objective position (exposed check portion) in case where the auxiliary electrode is formed in the narrower adjacent portion, it is difficult to obviate the damage of the drive electrodes 31, exactly auxiliary electrode adjacent to (closer to) the objective portion. The arrangement of the exposed check portion shown in FIG. 11 is effective in this respect. On the other hand, on each of the drive electrodes 32 generally having a wider width than that of the drive electrodes 31 (as is apparent from FIGS. 11 and 12), an auxiliary electrode 6a (dotted portion in FIG. 12) may preferably be disposed at both end portions of the exposed check portion 33 (i.e., so as to surrounding (enclosing) the exposed check portion 33) as shown in a lower part of FIG. 12 in order to suppress an increase in the electrode resistance. In the present invention, the electrode structures of the drive electrodes 31 and 32 at the lead-out end sections thereof as shown in FIGS. 11 and 12 may appropriately be selected as an electrode structure on the first and/or second substrates in view of widths of electrodes used.

After forming the auxiliary electrodes 7a and 7b, the dummy electrodes 41 and the exposed check portions 3, measurement of the electrode resistance and inspection of an occurrence of the short-circuit may preferably be performed by using the dummy electrodes 41 and the exposed check portions 41, respectively.

In the present invention, the electrode structures as mentioned above are adopted, whereby the damage of the drive electrodes can be prevented in this step to improve not only a device production yield through the entire production process but also an accuracy of the inspection step per se, thus consequently realizing a high-reliability liquid crystal device.

Step-k (FIGS. 5E and 6C):

On the entire electrode surface, short-circuit prevention layers 8a an 8b each of which is an insulating layer for preventing a short-circuit between the first and second (treated) substrates are formed by sputtering, application, baking, etc. Examples of a material therefor may include Ti-Si, $SiO_2$, $TiO_2$, and $Ta_2O_5$. The short-circuit prevention layers 8a and 8b may have a single layer structure or a lamination layer structures of plural layers formed by using the above materials singly or in combination of plural species. More specifically, the short-circuit prevention layers 8a and 8b may preferably have a lamination structure, e.g., comprising 500–1200 Å-thick $Ta_2O_5$ layer (lower layer) formed by sputtering and 500–1000 Å-thick Ti-Si layer (upper layer) formed by printing with an application solution therefor, followed by baking. The short-circuit prevention layers 8a and 8b may preferably extend to outside a sealing portion (described hereinafter).

Step-l (FIGS. 5E and 6C):

On the entire surface of the short-circuit prevention layers (8a, 8b), roughened surface-forming layers 9a and 9b for preventing movement of (chiral smectic) liquid crystal molecules during the drive of the device are formed to provide alignment layers to be formed thereon with roughened surfaces. This is because chiral smectic liquid crystal molecules are liable to continually (or intermittently) move toward the periphery of the device under application of an applied voltage in some cases.

The roughened surface-forming layers 9a and 9b may, e.g., be formed by dispersing $SiO_2$ beads (diameter: 300–700 Å) within an insulating film-forming solution (Ti/Si=1/1) in an amount of 5–30 wt. %, printing the solution with an extension plate and baking the resultant solution to form a 100–300 Å-thick layer. Similarly as in the layers 8a and 8b, the roughed surface-forming layers 9a and 9b may preferably extend to outside a sealing agent.

Step-n (FIGS. 5E and 6C):

On the roughened surface-forming layers 9a and 9b, alignment layers 10a and 10b comprising an insulating layer for controlling the alignment direction of liquid crystal molecules are formed. Examples of a material therefor may include organic insulating resins (polymers), such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, and acrylic resin.

Each of the (insulating) alignment layers 10a and 10b may, e.g., be formed by applying or printing a solution of the above material onto the surface of the roughened surface-forming layer (9a, 9b) in a region within the sealing area (preferably in the display region), followed by baking at 200–300° C. to provide an insulating layer having a thickness of, e.g., 50–1000 Å. The insulating layer is subjected to uniaxial alignment treatment (e.g., rubbing) by pushing a roller, about which a raised rubbing cloth is wound, onto the alignment layer surface at a rotation speed of 500–2000 rpm to provide alignment layers 10a and 10b. Examples of a material for the rubbing cloth may include natural fibers, such as cotton and synthetic fibers, such as fibers of aramide, nylon, rayon, teflon (polytetrafluoroethylene), polypropylene, and acrylic fiber. Of these, aramid fiber may preferably be used for the rubbing cloth.

The above rubbing treatment may be performed with respect to a limited part of the alignment layer surface by using a mask (frame), e.g., disposed at the periphery of the alignment layer surface. The rubbing condition (e.g., rotation speed and moving speed of the roller) may appropriately be selected.

After the rubbing (uniaxial aligning) treatment, the first and second substrates having thereon the (insulating) alignment layers 10a and 10b, respectively, are washed (or cleaned).

Step-n (FIG. 15A):

On the surface of one of the alignment layers 10a and 10b formed over the first and second substrate (preferably the alignment layer 10a formed over the first substrate), adhesive beads 11 are dispersed. The adhesive beads 11 do not have adhesiveness at normal temperature (e.g., room temperature) and at the time of the drive of the device but assume adhesiveness under heating, e.g., at the time of applying the first and second substrates to each other in the subsequent step (Step-q).

Examples of a material for the adhesive beads 11 may include thermosetting resins, such as epoxy resin and acrylic resin, not adversely affecting a liquid crystal to be come in contact therewith. The adhesive beads 11 may preferably have a diameter of 2–10 μm and may generally be dispersed at a density of 50–130 particles/mm$^2$ in the form of a dispersion thereof in a solvent (e.g., isopropyl alcohol). The adhesive beads 11 are caused to attach to the first and second substrates after the step (Step-q appearing hereinafter) of applying the first and second substrate each other under heating. As will be described hereinbelow, the first and second substrates are subjected to scribing (or cutting) to remove unnecessary portions in different positions, thus exposing electric terminals thereof, respectively. If the adhesive beads 11 are moved to the scribing region, an unnecessary portion to be removed is caused to adhere to the other (opposite) substrate. For this reason, no adhesive beads 11 may desirably be present in the scribing region. Accordingly, the adhesive beads 11 which are liable to move at room temperature may preferably be dispersed in a region corresponding to the sealing area within the sealing portion.

Step-o (FIGS. 15A and 16):

On the other alignment layer formed over the other substrate (preferably the alignment layer 10b over the second substrate) a sealing agent 21 is patterned as shown in FIG. 16 so as to leave an injection port 22.

Referring to FIG. 16, a dummy wall 23 in parallel with the side wall of the sealing agent 21 is also formed by using the sealing agent but may be formed in other positions (e.g., a remotest position from the injection port in parallel with the opposite wall to the wall including the injection port).

Examples of a material for the sealing agent 21 (including one for the dummy wall 23) may include thermosetting resins, such as thermosetting epoxy resin. The pattern of the sealing agent 21 and dummy wall 23 may be provided, e.g., by using a disperser or through a screen printing process in view of the material used. The pattern has prescribed thickness and width which may appropriately be controlled in view of a cell gap, an application amount, etc.

In case where the color filter 3 is formed in the peripheral region other than the display region, the dummy wall 23 may be disposed in a position corresponding to that of the color filter 3 or outside thereof. In view of a cell gap, the latter may preferably be adopted in the present invention.

Step-p (FIG. 15A):

On the surface of the alignment layer (preferably the alignment layer 10b) formed over the substrate (preferably the second substrate having the sealing agent 21) different from the substrate (preferably the first substrate) over which the adhesive beads 11 are dispersed, spacer beads 12 are dispersed. The spacer beads 12 are selected to have a diameter larger than a liquid crystal layer thickness (T as shown in FIG. 3) and may generally have a diameter 0.6–2.5 μm. For example, when the liquid crystal layer thickness is set to be 1 μm, the spacer bead 12 may preferably have a diameter of about 1.2–1.3 μm. Examples of the spacer beads 12 may preferably include silica beads and alumina beads.

The spacer beads 12 may preferably be dispersed at a density of 100–700 particles/mm$^2$ in the form of a dispersion thereof in a solvent (e.g., ethanol) in a region enclosed by the sealing agent 21. The above solvent may preferably have no or poor dissolving power to the spacer beads 12.

In the present invention, the spacer beads 12 finally having a diameter larger than the liquid crystal layer thickness are used, so that the spacer beads 12 are fixed in a state such that the spacer beads 12 are partially embedded into the surfaces of the first and second substrates (exactly between the surfaces of the alignment layers 10a and 10b), thus suppressing movement thereto after sealing the cell to retain a uniform liquid crystal layer thickness.

Incidentally, with respect to the above Steps-o and p, the formation of the pattern with the sealing agent 21 (Step-o) may preferably be performed against a surface as smooth as possible free from unevenness in terms of warkability and accuracy and accordingly may desirably be performed in advance of the dispersion of the spacer beads (Step-p). In this respect, it is important to conduct the Step-o and the Step-p in this order.

Further, in the Step-n, the dispersion of the adhesive beads 11 may preferably be effected on the surface of a substrate on (over) which the sealing agent 21 is patternized in order to effect only in a region corresponding to the sealing area (enclosed by the sealing agent 21). Accordingly it is preferred that the adhesive beads 11 are dispersed on one substrate (e.g., the first substrate) and the formation of the sealing agent pattern and the dispersion of the spacer beads 12 are performed on the other substrate (e.g., the second substrate).

Step-q (FIGS. 15A, 15B and 15C):

The substrate (preferably the first substrate) on which the adhesive beads 11 are dispersed (distributed) is fixed, and the other (opposite) substrate (preferably the second substrate) whereon the sealing agent 21 and the spacer beads 12 are disposed is applied onto the above substrate each other so as to dispose the above structural members (11, 12, 21) between the alignment layers 10a and 10b formed on the first and second substrates under heat and pressure for 10–120 min., whereby the adhesive beads 11 and the sealing agent 21 are hardened (or thermoset) to bond the first and second substrates to each other. In a preferred embodiment, the above adhesive bonding of the two substrates is performed while fixing (setting) the substrate having thereon the adhesive beads 11 so as to direct the dispersion face of the adhesive beads 11 at the uppermost (topmost) to surface.

As described above, the adhesive beads 11 and the spacer beads 12 are separately dispersed on different substrates, respectively, and the substrate having thereon the adhesive beads 11 being liable to readily move at normal temperature is fixed, whereby the adhesive beads 11 are not readily moved, thus preventing localization and detachment thereof. On the other hand, the spacer beads 12 generally has a smaller diameter than that of the adhesive beads 11, so that the spacer beads 11 remain in the original position even when the substrate having thereon the spacer beads 11 is turned upside down for bonding to the fixed substrate carrying the adhesive beads 11. As a result, the spacer beads 12 do not readily cause localization and detachment thereof.

According to this step (Step-q), the first and second substrates are adhesively bonded to each other while retaining their uniform dispersion states.

Step-r:

In order to expose connection terminals of the electrodes, the first and second substrates are subjected to scribing (cutting) of unnecessary portions, respectively. In view of arrangement of the connection terminals, the unnecessary portions of the first and second substrates to be removed are generally different in position from each other, so that the corresponding scribing positions thereof are also different.

Incidentally, immediately before the scribing of the first and second substrates, an identification means (e.g., a bar-code label) is provided to a certain position of the substrates in the vicinity of the injection port, thus allowing the identification of respective blank cells prepared by scribing (cutting) the first and second substrates.

Step-s:

A liquid crystal (preferably a chiral smectic liquid crystal) is injected into the above-prepared blank cell (i.e., a spacing between the first and second substrates). Examples of a liquid crystal material are specifically described hereinafter.

The injection operation may, e.g., be generally performed as follows.

First, a blank cell is placed in a vacuum apparatus. In a sufficient vacuum state of the inside the apparatus (blank cell), a liquid crystal is attached to the injection port of the cell. Then, the reduced pressure of inside the apparatus is gradually restored to atmospheric pressure, thus injecting the liquid crystal into the cell at a speed which may preferably be controlled as identical as possible.

In the present invention, a liquid crystal layer 13 formed as described above has a thickness (T) smaller than the maximum thickness (t) of the coating layer 4 having a pencil hardness of at most 7 H as shown in FIG. 3, whereby the liquid crystal layer 13 has no or a little void (unfilled portion of the liquid crystal) to minimize a defective cell due to the softness of the thicker coating layer 4 particularly compared with a liquid crystal device including no such a coating layer. Further, by forming the coating layer 4 extending to the portion over which the sealing agent 21 is disposed, the liquid crystal injection is further facilitated, thus improving a production yield.

Figure 14A:
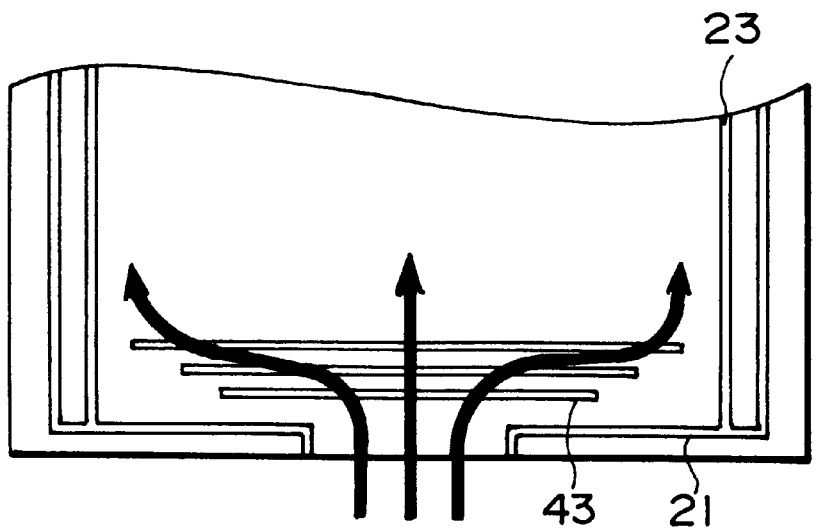
FIGS. 14A and 14B are plan views illustrating embodiments of flowing (injection) behaviors of liquid crystals as to the liquid crystal device of the invention and an ordinary liquid crystal device, respectively.

As shown in FIGS. 13B and 14A, the elongated projections 43 (e.g., composed of ITO) are formed in the vicinity of the injection port, whereby the injection liquid crystal flows and extends along the projections 43 as shown by arrows in FIG. 41A to prevent an occurrence of an unfilled portion (void) at a position closer to the wall (sealing agent 21) having the injection port.

Figure 14B:
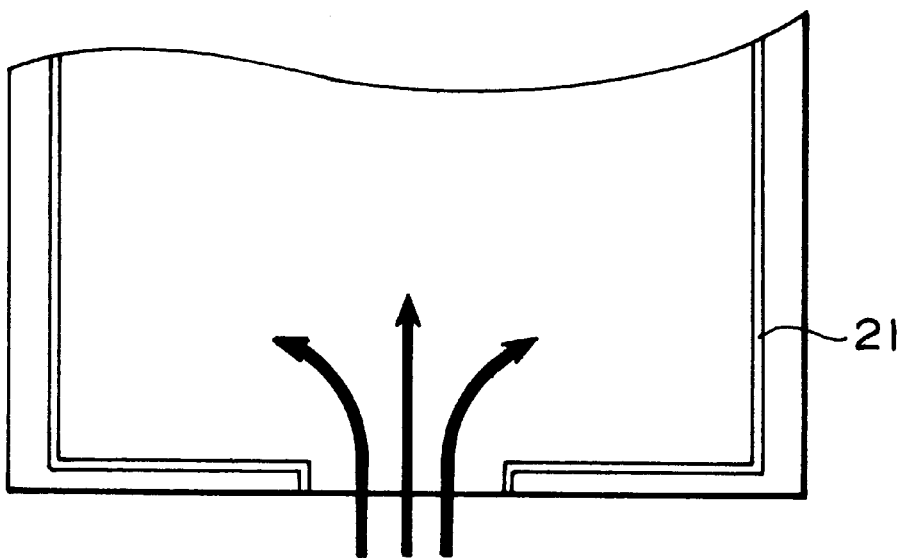

FIG. 14B shows a flowing behavior of a liquid crystal in a conventional liquid crystal cell. In this cell, the injection of the liquid crystal is liable to become ununiform, thus leaving voids particularly on the injection port side.

In the present invention, as shown in FIG. 14, the dummy walls 23 are formed in parallel with the side walls of the sealing agent 21, whereby, even if voids are left in the display region, the voids are forced into a spacing between the dummy wall 23 and the side wall 21 during the injection step. As a result, there is substantially no void in the display region, thus minimizing an occurrence of a defective cell.

Step-t:

After the completion of the liquid crystal injection, the injection port of the liquid crystal cell is sealed up with a sealing agent, such as room temperature curing epoxy resin, followed by washing the cell with a weak alkaline solution to provide a liquid crystal device (panel) according to the present invention.

Outside the liquid crystal device (panel), a pair of polarizers are applied to the first and second substrates 1a and 1b, respectively, and a driving integral circuit (driving IC) is connected to the corresponding terminal of the electrodes (6a, 6b, 7a, and 7b).

The liquid crystal used in the present invention may preferably be a chiral smectic liquid crystal composition (or mixture) containing two or more mesomorphic compounds and at least one optically active compound (as a chiral dopant).

Herein, the term "mesomorphic compound" means not only a compound showing a mesomorphic (or liquid crystal) phase by itself but also a compound not showing a mesomorphic phase as long as a resultant liquid crystal composition containing the compound shows a mesomorphic phase.

Examples of the above mesomorphic compounds (including the optically active compound) may include those represented by formulae (1)–(5) shown below. These mesomorphic compounds are mixed in an appropriate proportion to constitute a chiral smectic liquid crystal composition.

The mesomorphic compounds of the formulae (1) to (5) may include those shown below:

Formula (1)

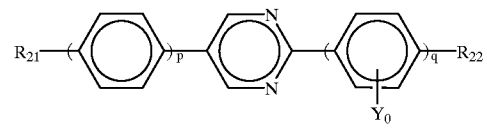

wherein p and q independently denote 0, 1 or 2 satisfying p+q=1 or 2; $Y_0$ is hydrogen or fluorine; and $R_{21}$ and $R_{22}$ independently denote a linear or branched alkyl group having 1–18 carbon atoms capable of including at least one methylene group which can be replaced by —O—, —S—, —CO—, —CH=CH—, —C≡C—, or —CHW— where W is halogen, CN or $CF_3$ provided that heteroatoms are not adjacent to each other;

Formula (2)

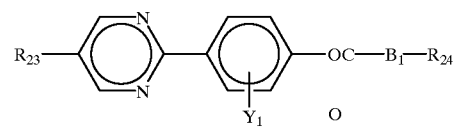

wherein $B_1$ is

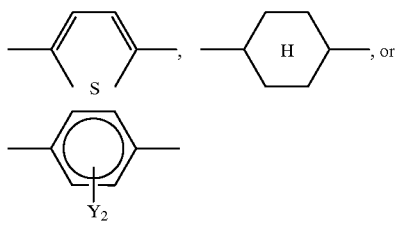

where $Y_2$ is hydrogen or fluorine; $Y_1$ is hydrogen or fluorine; $R_{23}$ is a linear or branched alkyl group having 1–18 carbon atoms; $R_{24}$ is hydrogen, halogen, CN, or a linear or branched alkyl group having 1–18 carbon atoms; and at least one methylene group in the alkyl group of $R_{23}$ or $R_{24}$ can be replaced by —O—, —S—, —CO—, —CH=CH—, —C≡C—, or —CHW$_2$— where $W_2$ is halogen, CN or CF$_3$ provided that heteroatoms are not adjacent to each other;

Formula (3)

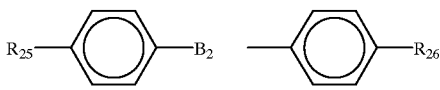

wherein $B_2$ is

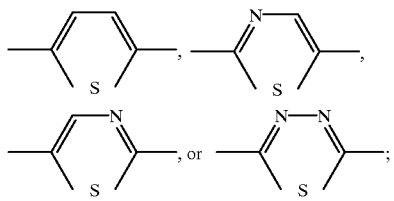

and and $R_{25}$ and $R_{26}$ independently denote a linear or branched alkyl group having 1–18 carbon atoms capable of including at least one methylene group which can be replaced by —O—, —S—, —CO—, —CH=CH—, —C≡C—, or —CHW$_3$— where $W_3$ is halogen, CN or CF$_3$ provided that heteroatoms are not adjacent to each other;

Formula (4)

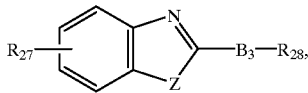

wherein $B_3$ is

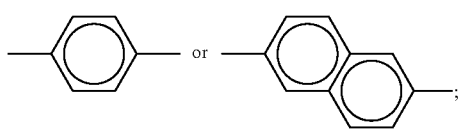

Z is O or S; and $R_{27}$ and $R_{28}$ independently denote a linear or branched alkyl group having 1–18 carbon atoms capable of including at least one methylene group which can be replaced by —O—, —S—, —CO—, —CH=CH—, —C≡C—, or —CHW$_3$— where $W_4$ is halogen, CN or CF$_4$ provided that heteroatoms are not adjacent to each other; and Formula (5)

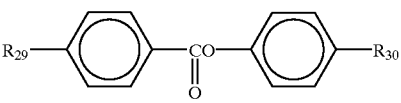

wherein $R_{29}$ and $R_{30}$ independently denote a linear or branched alkyl group having 1–18 carbon atoms capable of including at least one methylene group which can be replaced by —O—, —S—, —CO—, —CH=CH—, —C≡C—, or —CHW$_5$— where $W_5$ is halogen, CN or CF$_3$ provided that heteroatoms are not adjacent to each other.

In the above formulae (1) to (5), the respective groups $R_{21}$–$R_{30}$ may be an optically active or optically inactive.

With respect to the above mesomorphic compound of the formulae (1)–(4), examples of the mesomorphic compound of the formula (1) may preferably include those of the formulae (1-1) to (1-7); examples of the mesomorphic compound of the formula (2) may preferably include those of the formulae (2-1) to (2-5); examples of the mesomorphic compound of the formula (3) may preferably include those of the formulae (3-1) to (3-9); and examples of the mesomorphic compound of the formula (4) may preferably include those of the formula (4-1) to (4-6), respectively shown below:

Formula (1-1)

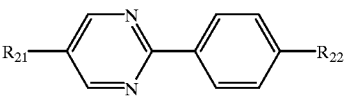

Formula (1-2)

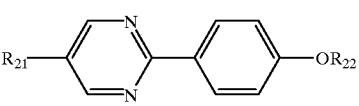

Formula (1-3)

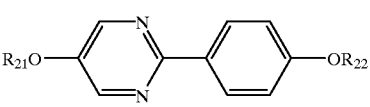

Formula (1-4)

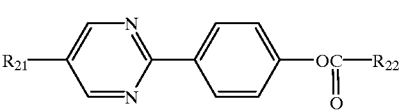

Formula (1-5)

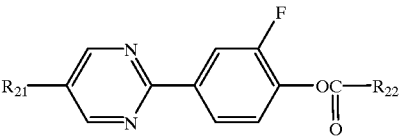

Formula (1-6)
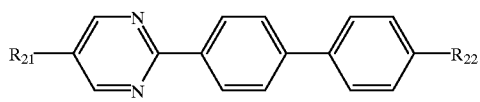
Formula (1-7)
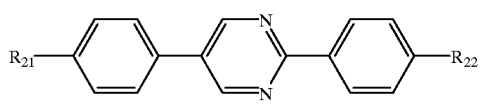
Formula (2-1)
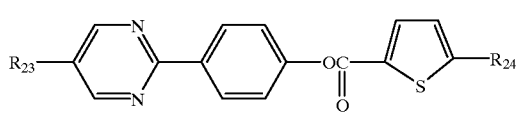
Formula (2-2)
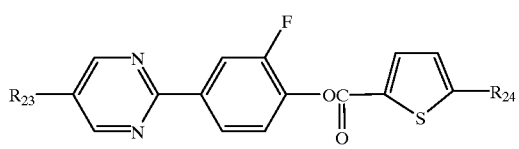
Formula (2-3)
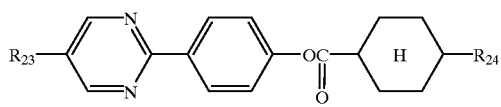
Formula (2-4)
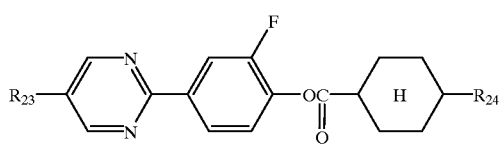
Formula (2-5)
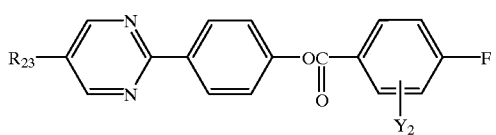
Formula (3-1)
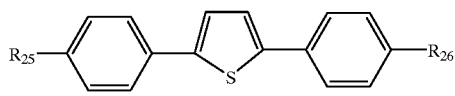
Formula (3-2)
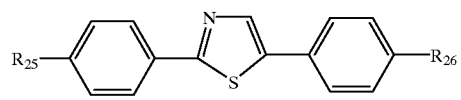
Formula (3-3)
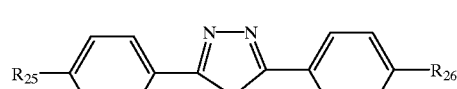
Formula (3-4)
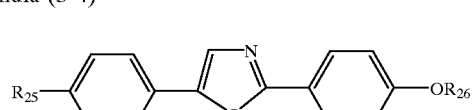
Formula (3-5)
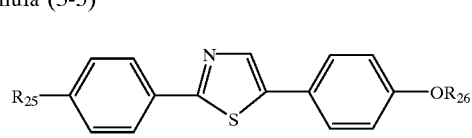
Formula (3-6)
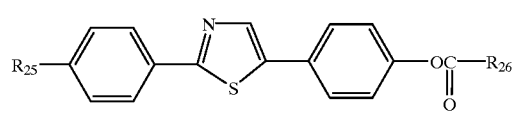
Formula (3-7)
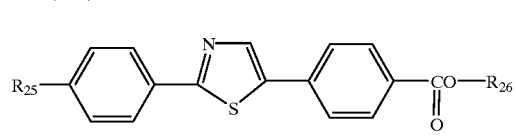
Formula (3-8)
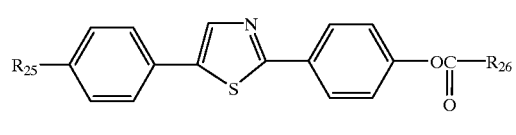
Formula (3-9)
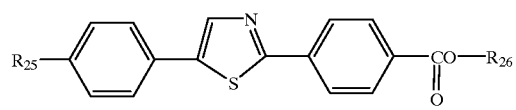

Formula (4-1)

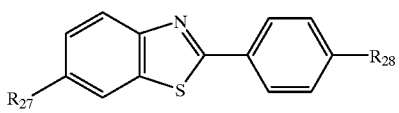

Formula (4-2)

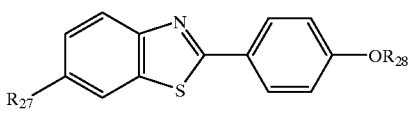

Formula (4-3)

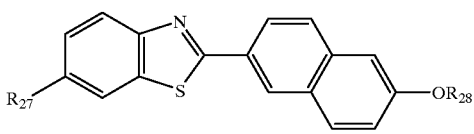

Formula (4-4)

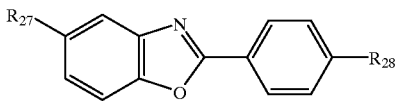

Formula (4-5)

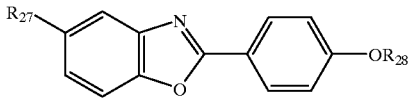

Formula (4-6)

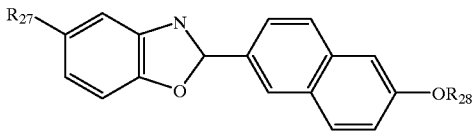

In the above formulae (1-1) to (4-6), $R_{21}$ to $R_{28}$ and $Y_1$ have the same meanings as defined above.

The mesomorphic compounds of the formulae (1-1) to (4-6) may be used singly or in combination of two or more species or used together with other mesomorphic compounds.

Hereinbelow, a more specific embodiment of the present invention will be explained with reference to FIGS. 1 and 3.

Figure 1:
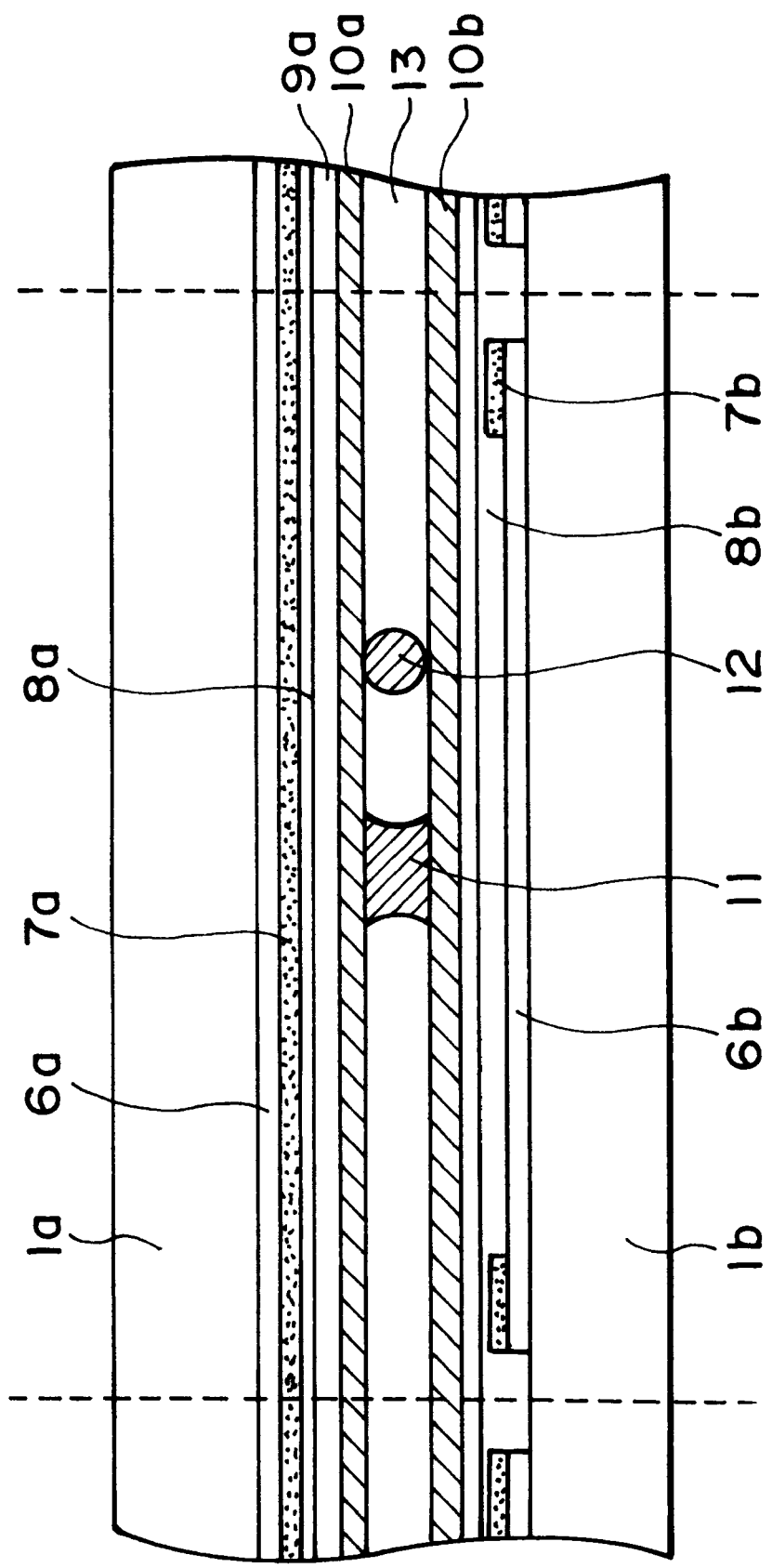
FIG. 1 is a sectional view of a liquid crystal device effecting two-valued display (black and white display).

A color liquid crystal device (color panel) having a coating layer 4 as shown in FIG. 3 and a monochromatic liquid crystal device (monochromatic panel) having no coating layer 4 as shown in FIG. 1 were prepared, respectively, in the following manner.

A blank cell 1 for the color panel (according to the invention) and a blank cell 2 for the monochromatic panel were prepared according to the above-described Step-a to Step-r, as desired, specifically in the following manners, respectively.

Blank cell 1
(First substrate)

On a sheet glass, a coating layer (siloxane; maximum thickness (t)=3 μm; pencil hardness—4 H) was formed so as to cover (coat) a color filter film pattern comprising R, G and B color filter segments (thickness=c.a. 1.5 μm). On the coating layer, a barrier layer was formed and thereon, a c.a. 700 Å-thick ITO film (transparent electrode) provided with an auxiliary electrode and having a prescribed pattern was formed. On the ITO film, a 2000 Å-thick insulating film having a lamination structure comprising a short-circuit prevention layer, a roughened surface-forming layer and an alignment layer (film) was formed to provide a first substrate.

(Second substrate)

On a sheet glass, a c.a. 700 Å-thick ITO film provided with an auxiliary electrode and having a prescribed pattern was formed. On the ITO film, a 2000 Å-thick insulating layer having a lamination structure comprising a short-circuit prevention layer, a roughened surface-forming layer and an alignment layer was formed to provide a second substrate.

Adhesive beads (diameter=c.a. 5 μm) were dispersed (or distribution) over the first substrate. Separately, a sealing agent was disposed and patternized on the second substrate and then spacer beads (diameter=1.1 μm) were dispersed over the second substrate.

The second substrate was applied to the first substrate (which was fixed) each to provide a cell gap of 1 μm corr. to a liquid crystal layer thickness (T), whereby a blank cell 1 was prepared.

Blank cell 2

A blank cell 2 was prepared in the same manner as in the preparation of the blank cell 1 except that first and second substrates were prepared in the same manner as in the second substrate of the blank cell 1, respectively.

A liquid crystal mixture having a phase transition series on temperature decrease shown below was injected into each of the above-prepared blank cells 1 and 2 at a constant speed in accordance with the Step-s described hereinabove, respectively.

Phase transition temperatures (° C.)

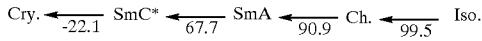

Iso.: isotropic phase,
Ch.: cholesteric phase,
SmA: smectic A phase,
SmC*: chiral smectic C phase, and
Cry.: crystal phase.

The phase transition temperature (° C.) is determined by observation through a polarizing microscope in combination with a differential scanning calorimeter ("DSC-7" manufactured by Parkinelmer Co.) and Metlar Hot Stage ("Thermo System FP-80/FP-82" manufactured by Metler Co.).

The thus-prepared liquid crystal devices (color an monochromatic panels) were subjected to evaluation of a degree of occurrence of a void in the liquid crystal layer. More specifically, after the injection of the liquid crystal mixture described above, each of the color panel and the monochromatic panel was retained at 25° C. and then cooled to prescribed temperatures (−5° C., −10° C., −15° C.) in 1 hour, respectively, and was left standing for 100 hours at the respective temperatures. After the standing, each of the panels was restored to 25° C. in 1 hour and then subjected to eye observation of a void occurrence state with respect to 10 sample panels (partially 8 sample panels), whereby the number of a defective panel having at least one void was counted.

The results are shown in Table 1 below.

TABLE 1

| Temp. (° C.) | Color panel | Monochromatic panel |
|---|---|---|
| 25 | 0/10 | 0/10 |
| −5 | 0/10 | 0/10 |
| −10 | 0/10 | 2/10 |
| −15 | 0/10 | 8/8 |

*: Defective panel/Sample used

As apparent from the above results, the liquid crystal device (color panel) according to the present invention having the following characteristic features (i)–(iii):

(i) Thickness (T) of the liquid crystal layer is smaller than the diameter of spacer beads, (ii) Thickness (T) is smaller than the maximum thickness (t) of the coating layer, and (iii) The coating layer has a pencil hardness of at most 7, is effective in suppressing an occurrence of a void even after standing for a prescribed time of lower temperatures.

As described above, according to the above liquid crystal device of the present invention, the device has a uniform cell gap (L.C. layer thickness) and a uniform shock (impact) resistance over the entire panel area (particularly in the entire display region) because of the above feature (i) and a uniform adhesive boding of two substrates while retaining good dispersion states of adhesive beads and spacer beads. Consequently, there is provided a liquid crystal device capable of providing good display characteristics and having a high durability resistant of external shock. Further, based on the above features (ii) and (iii), the liquid crystal device has a flexible layer structure on the glass substrate effective in facilitating the liquid crystal injection into a spacing (particularly a very small spacing), thus suppressing an occurrence of a defective cell (panel). This effect is further enhanced by forming the coating layer (providing the features (ii) and (iii)) extending to a position over which the sealing pattern is formed.

By providing the above features (i)–(iii), there is provided a liquid crystal device having high performances including a lowering in an occurrence of a void at the time of the liquid crystal injection and after the standing at lower temperatures to suppress an occurrence of an alignment defect of liquid crystal molecules resulting from the void.

Hereinbelow, the color liquid crystal display apparatus according to the present invention will be described with reference to FIGS. 17–26.

Figure 17:
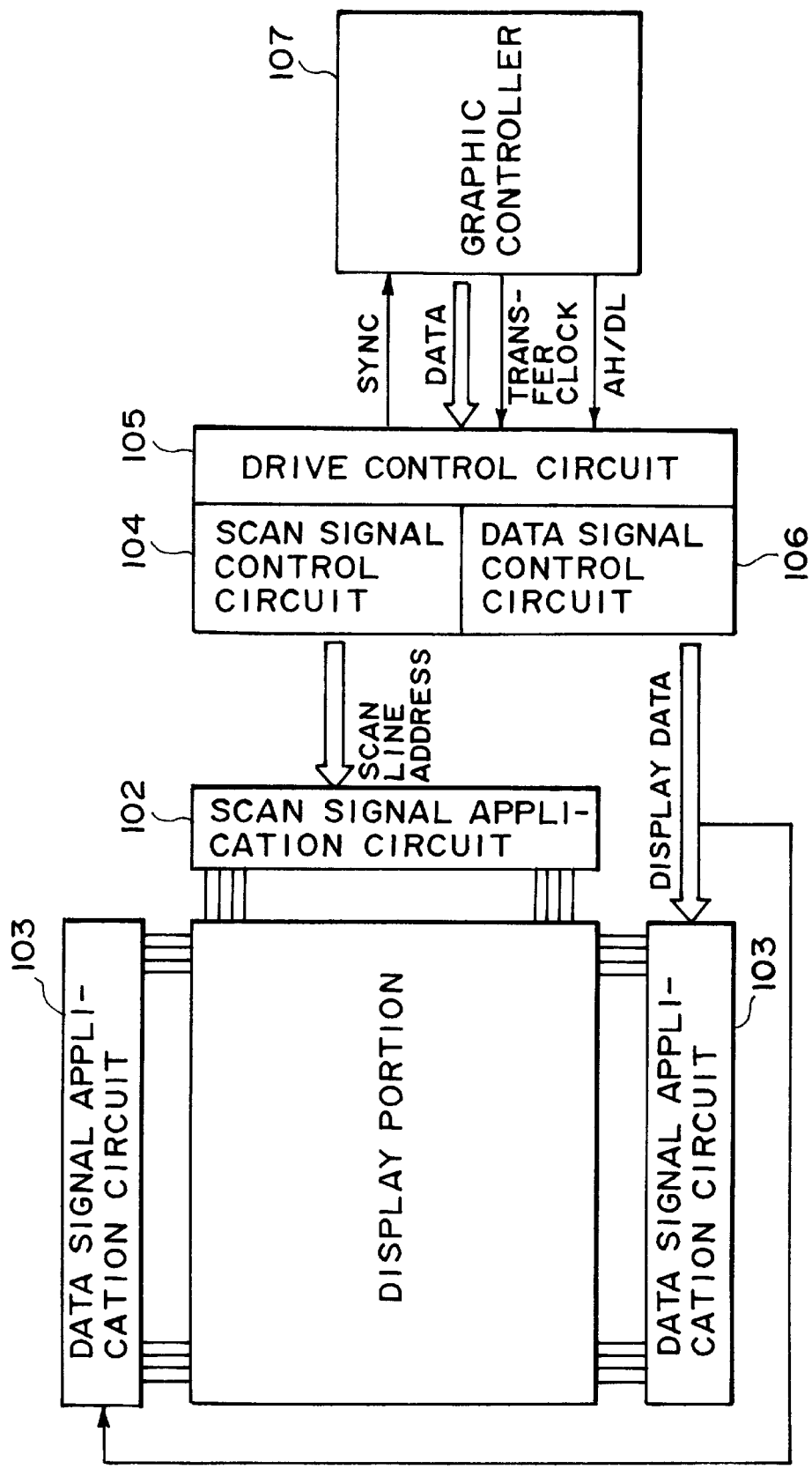
FIG. 17 is a block diagram of an embodiment of the color liquid crystal display apparatus of the invention.
Figure 18:
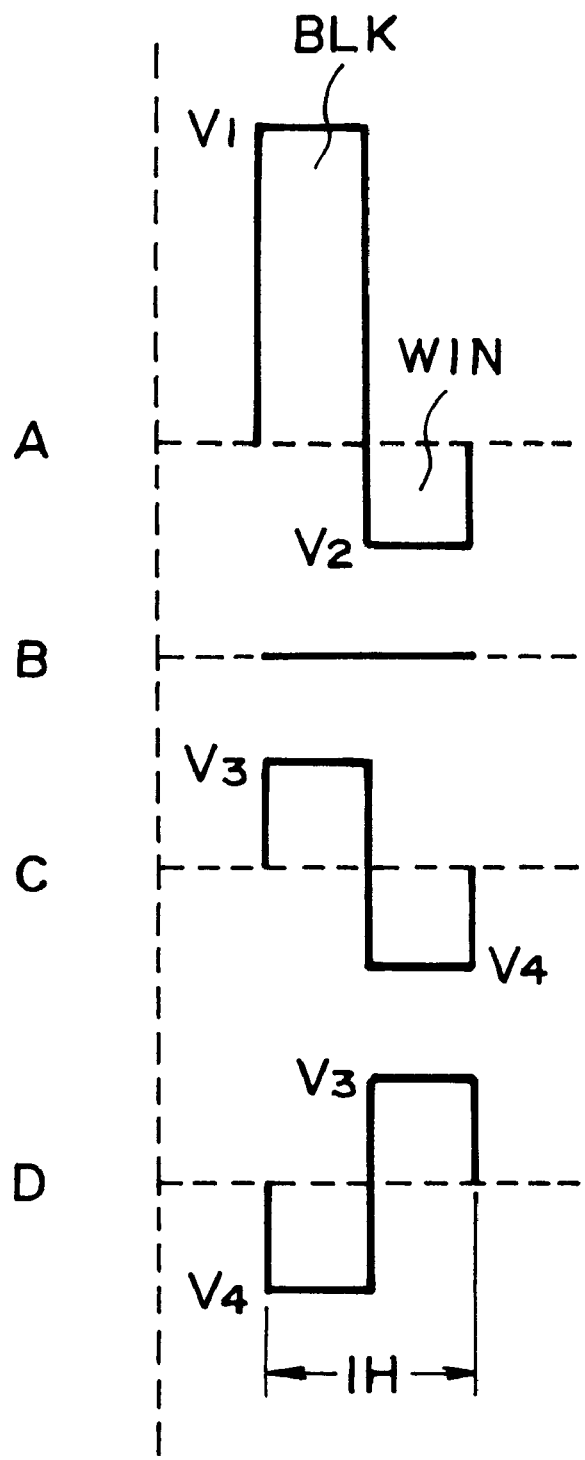
FIGS. 18–24 are respectively a time chart showing a set of drive signal waveforms adopted in an embodiment of the color liquid crystal display apparatus of the invention.
Figure 19:
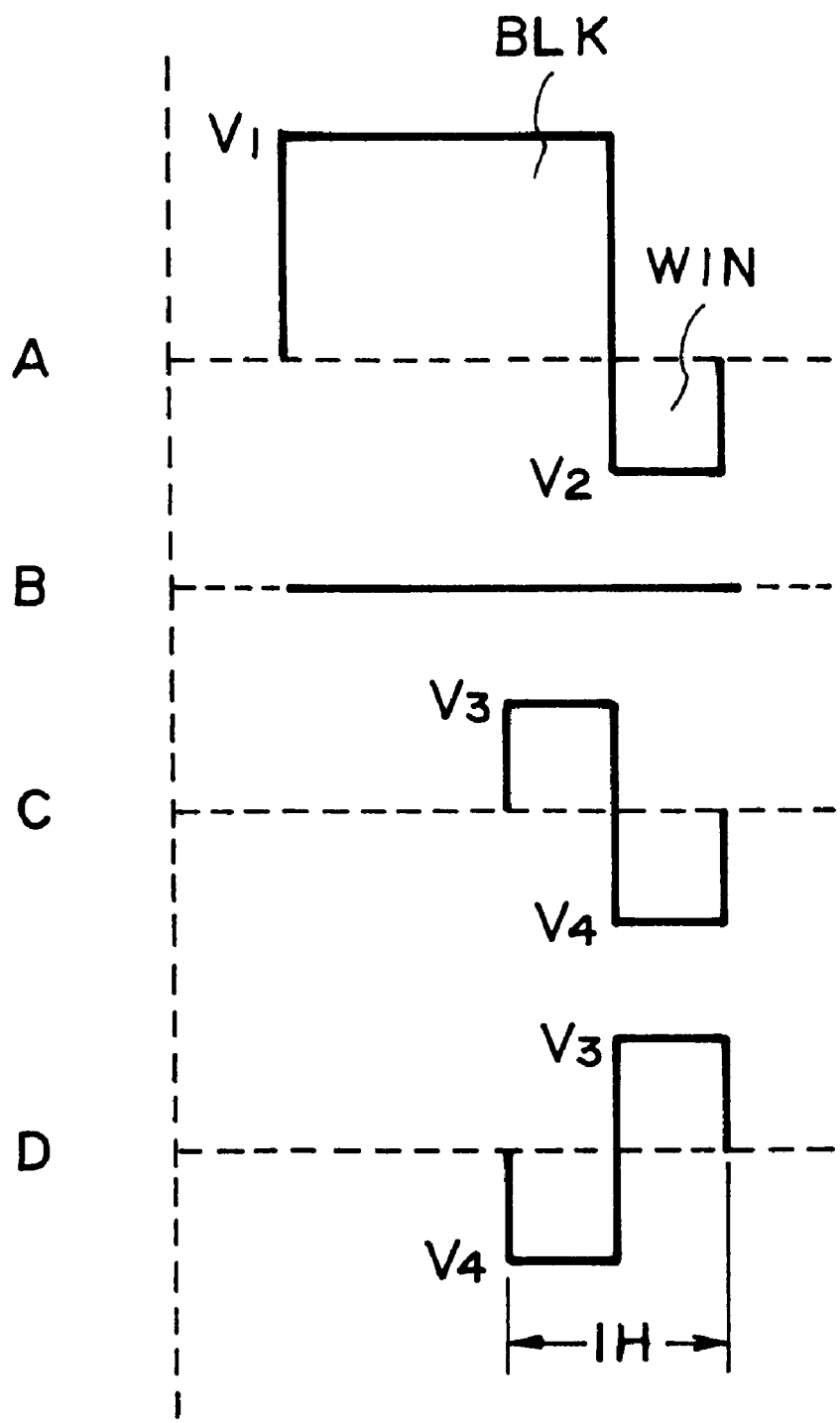
Figure 20:
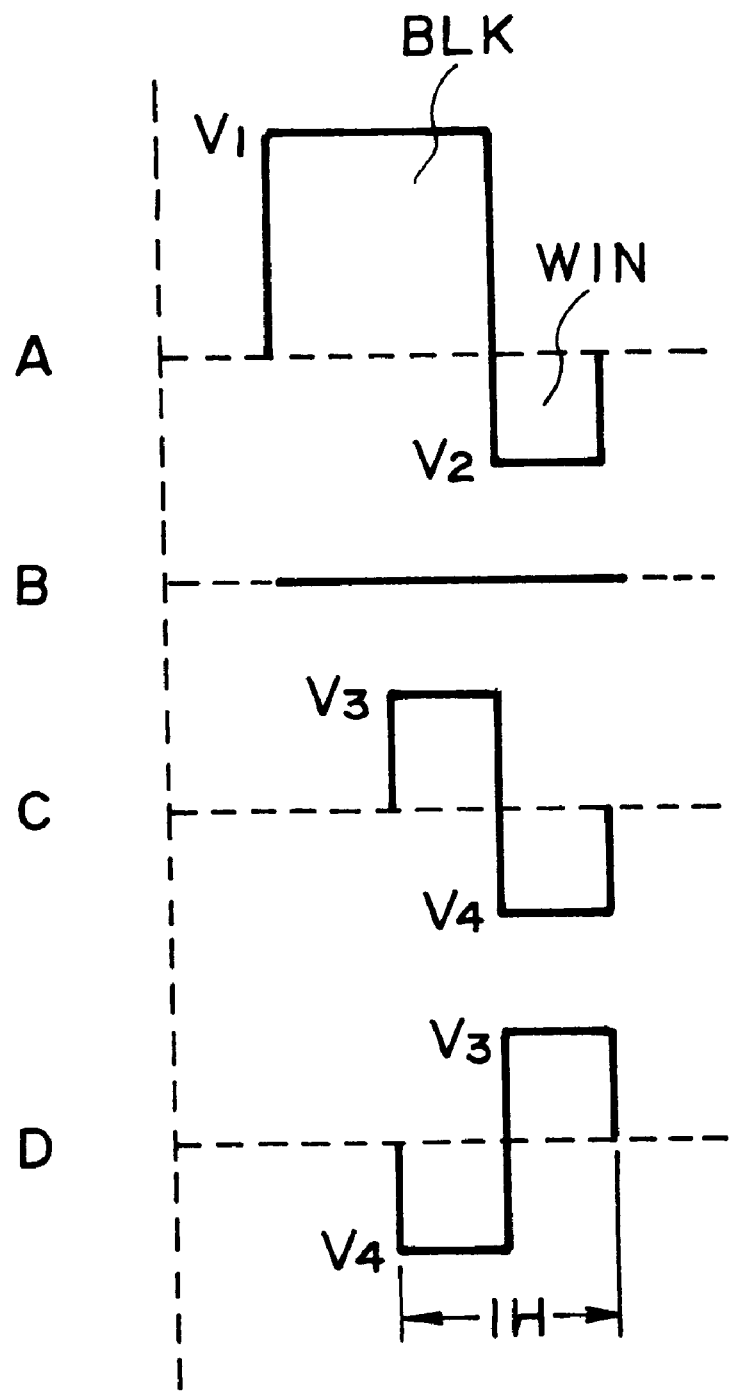

FIG. 17 shows a block diagram of an embodiment of the color liquid crystal display apparatus of the present invention.

Referring to FIG. 17, a color liquid crystal display apparatus include a display portion (display panel) 101, a scanning signal application circuit 102, two data signal application circuits 103, a scanning signal control circuit (scanning signal supply means) 104, a drive control circuit 105, a data signal control circuit (data signal supply means) 106, and a graphic controller 107.

Data sent from the graphic controller 107 are inputted into the scanning signal control circuit 104 and the data signal control circuit 106 via the drive control circuit 105, where the inputted data are converted into (scanning line) address data and display data, respectively. In accordance with the address data from the scanning signal control circuit 104, the scanning signal application circuit 102 generates a selection scanning signal waveform and a non-selection scanning signal waveform to be applied to a group of scanning (transparent) electrodes (scanning lines) of the display portion 101. On the other hand, in accordance with the display data from the data signal control circuit 106, the data signal application circuits 103 disposed opposite to each other with respect to the display portion 101 generate data signal waveforms each of which corresponds to each of color filter segments of red (R), green (G), blue (B) and white (W: transparent color), respectively, to be applied to a group of data (transparent) electrodes (data lines) of the display portion 101.

The group of scanning electrodes intersect with the group of data electrodes at right angles to provide a large number of pixels (1280×1024 pixels) at their intersections. Each of the intersections constitutes one pixel, e.g., containing four color filter segments (R, G, G, W).

The display portion 101 comprises the above-mentioned liquid crystal device according to the present invention. In the liquid crystal device, one group of transparent electrodes in the form of stripes formed on a substrate having a color filter and a coating layer thereon is used as the group of scanning electrodes. The other group of transparent electrodes in the form of stripes formed on a substrate having no color filter and no coating layer is used as the group of data electrodes in the color liquid crystal display apparatus of the invention. Further, the group of data electrodes (e.g., as shown in FIG. 11) has a width narrower (smaller) than a width of the group of scanning electrodes (e.g., as shown in FIG. 12).

A driving method of the above color liquid crystal display apparatus will be described hereinbelow.

FIGS. 18–24 respectively show a drive signal waveform used for the display apparatus.

In each of FIGS. 18–24, "AA" represents a selection scanning signal waveform, "B" represents a non-selection scanning signal waveform, and "C" and "D" respectively represent a data signal waveform. The waveforms A to D are respectively used as a voltage waveform for displaying a light (bright) state or a dark state. Further, "1 H" represents one horizontal scan period, "BLK" represents a clearing (erasing) pulse for clearing (resetting) a pixel on a selected scanning electrode to provide a prescribed display state, and "WIN" represents a writing pulse for determining a display state of a pixel on a selected scanning electrode.

A synthetic waveform formed by combining a writing pulse with a data signal is applied to a liquid crystal at a corresponding pixel, whereby a display state of the corresponding pixel is determined whether the display state resulting from the clearing pulse continues or whether the display state resulting from the clearing pulse is changed to the other display state.

Figure 21:
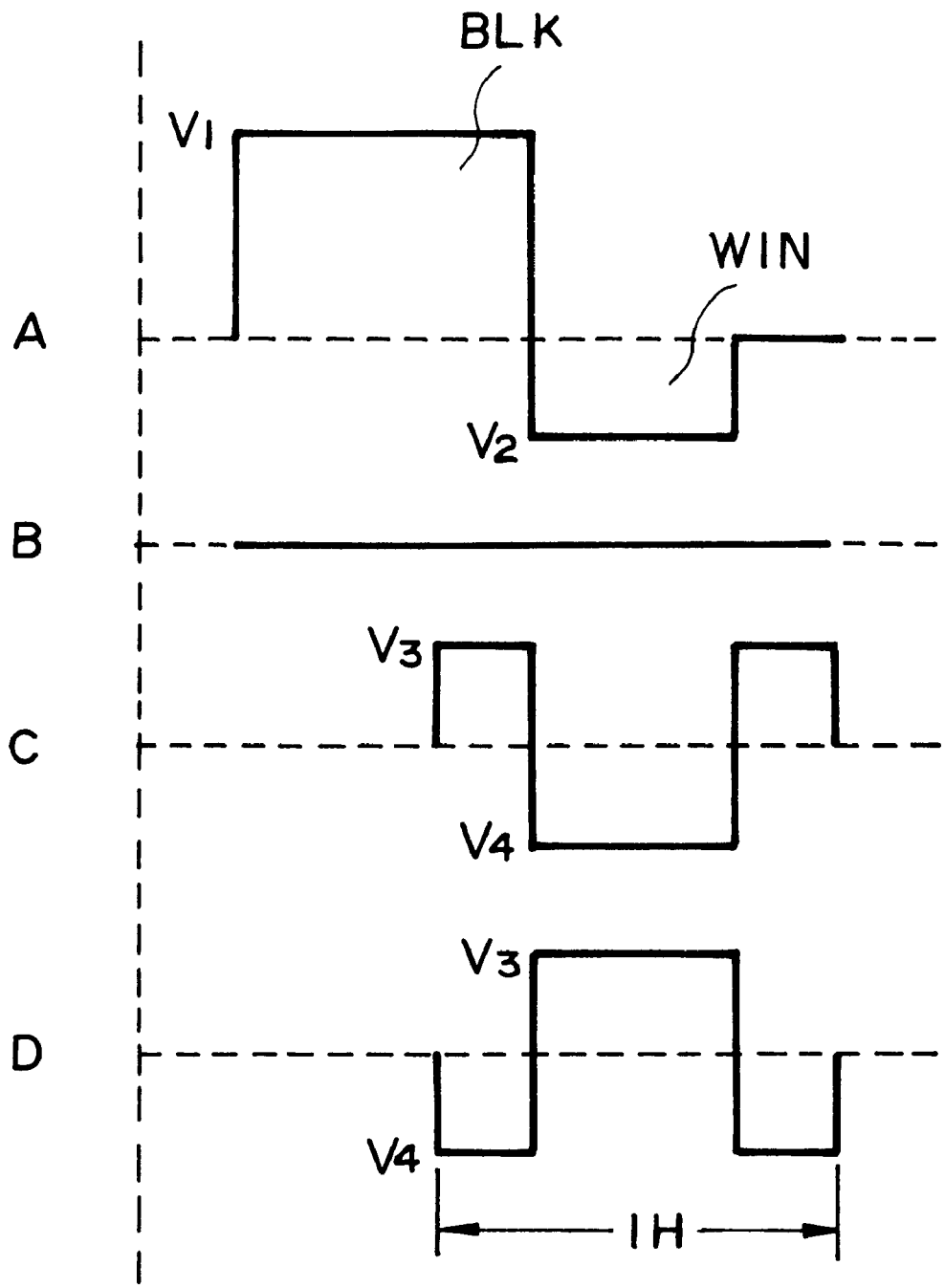
Figure 22:
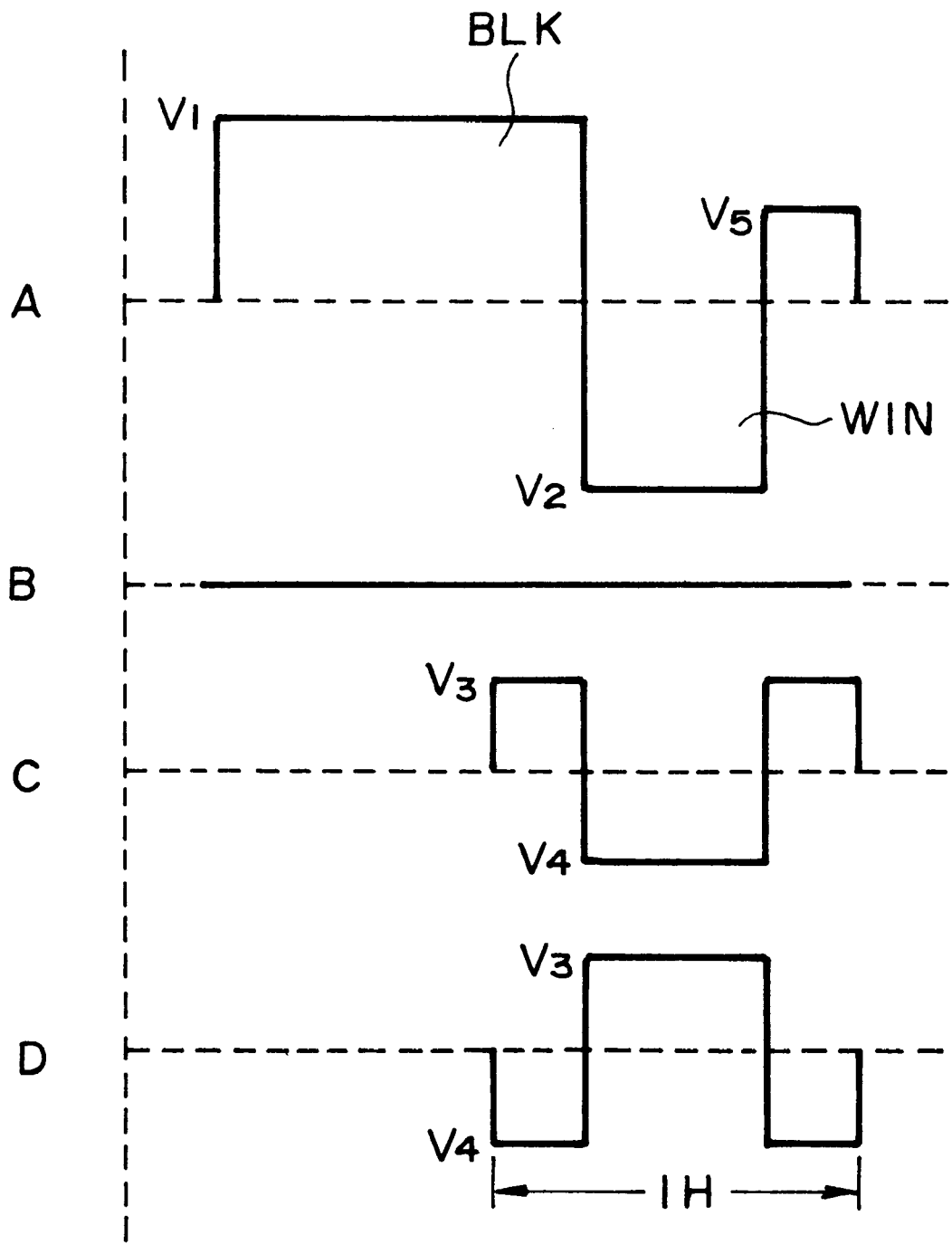
Figure 23:
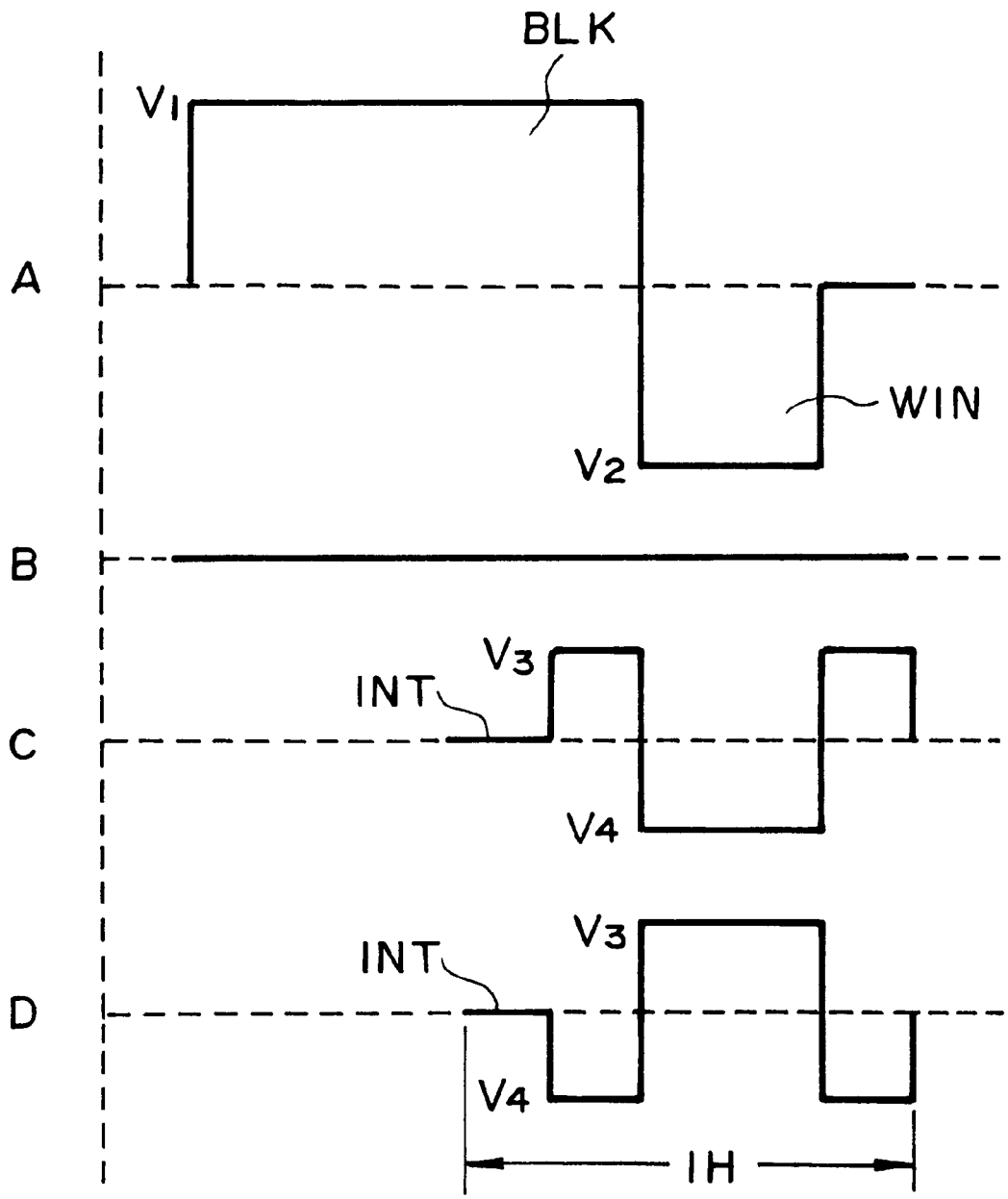
Figure 24:
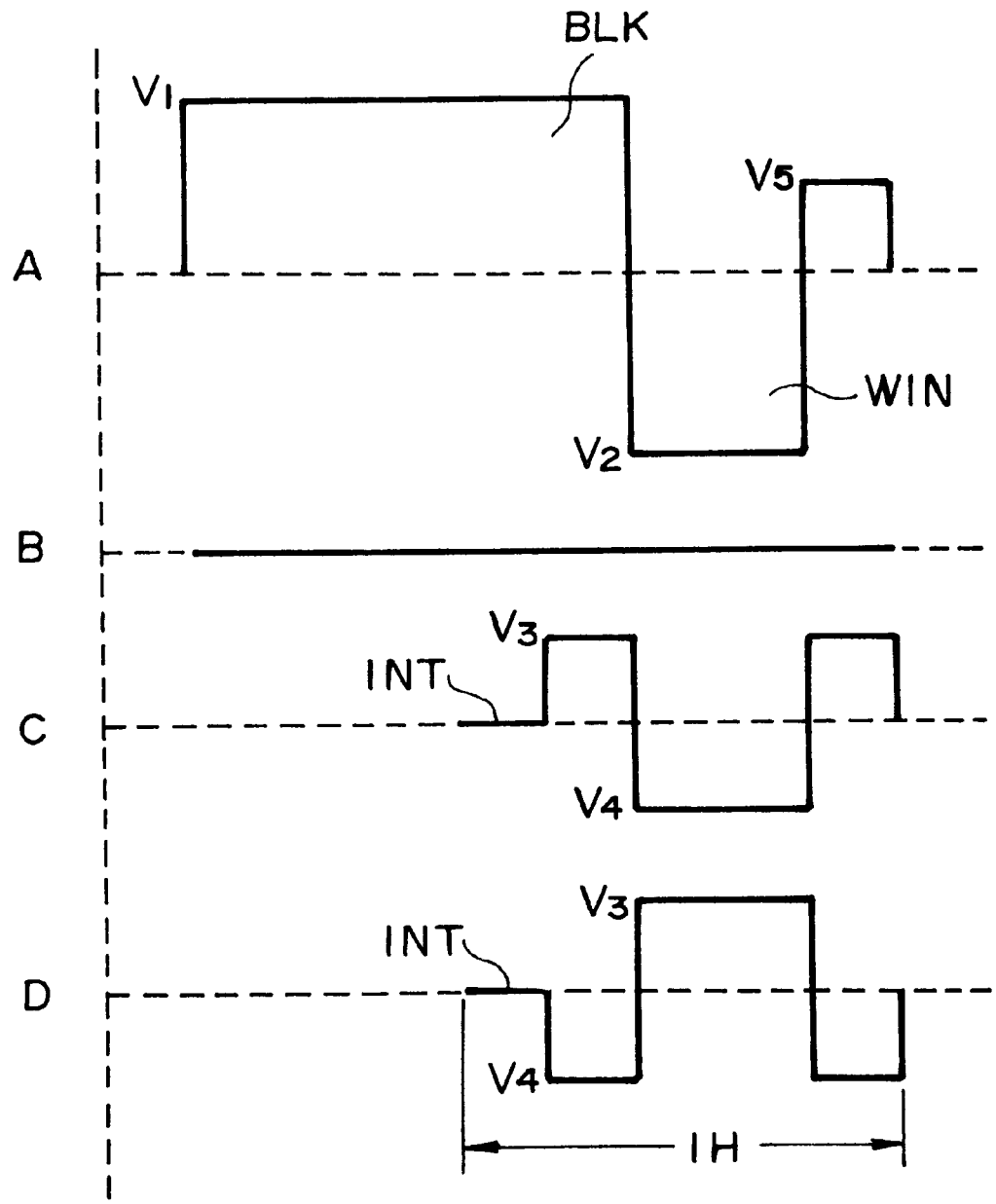

When a high frame frequency is used, the waveforms shown in FIGS. 21 and 22 may preferably be adopted compared with those shown in FIGS. 23 and 24.

Further, the waveforms shown in FIGS. 18–24 may appropriately be selected in view of flickering on a picture area and a required drive margin.

Figure 25:
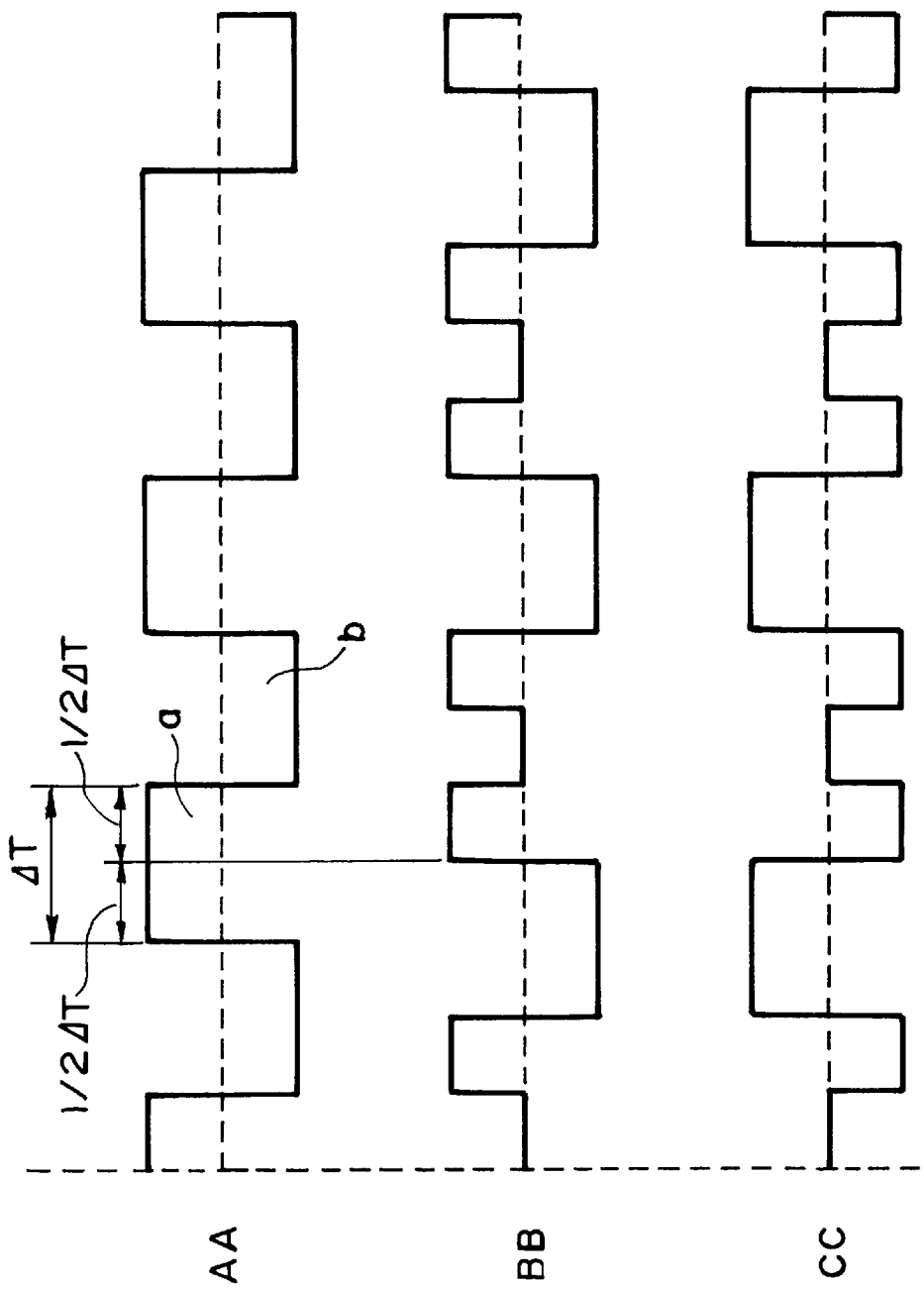
FIG. 25 shows a set of data signal waveforms.

FIG. 25 shows data signal waveforms (AA, BB and CC) applied to a certain data electrode. Each of the waveforms (AA, BB and CC) comprises a waveform containing only either one of signal waveforms ("light" and "dark") in succession in plural continuous horizontal scan period.

In FIG. 25, a waveform AA is an alternating-current waveform comprising continuously alternating pulses of a positive-polarity pulse a and a negative-polarity pulse b each having a duration ΔT. Specifically, the waveform AA comprises a continuity of the data signal waveform C or D shown in FIG. 21 or 22.

Waveforms BB and CC correspond to waveforms each identical to the waveform A except that each pulse a is provided with an interval of (½)ΔT (for BB) or that each pulse b is provided with an interval of (½)ΔT (for CC), respectively. The waveforms BB and CC have an identical effective value, and comprise a continuity of the data signal waveform C shown in FIGS. 23 or 24 and a continuity of the data signal waveform D shown in FIGS. 23 or 24, respectively.

When the respective waveforms AA, BB and CC were applied and observed, we have found that a degree of fluctuation of liquid crystal molecules has varied depending on the applied waveform. Specifically, in case where an inversion direction of liquid crystal molecules under application of a negative polarity voltage was one from U1 state to U2 state, it has found that liquid crystal molecules in U1 state have considerably fluctuated by the pulse b (negative-polarity pulse) an those in U2 state has also considerably fluctuated by the pulse a (positive-polarity pulse).

Such a fluctuation of liquid crystal molecules is recognized as a change in display color thus requiring attention.

Accordingly, in order to decrease a frequency such that the pulse b is applied to a pixel placed in U1 state, an interval (int) of (½)ΔT is provided to the data signal waveforms C and D as shown in FIGS. 23 and 24, whereby a direct-current pulse b other hand that for writing in U2 state is not applied even if the data signal waveform C or D shown in FIGS. 23 and 24 continues. In other words, if another one pixel displaying U1 state is present on the same data electrode, the frequency applying the direct-current pulse b is decreased by one time per one frame. In case where all the pixels on the same data electrode display U1 state, the direct-current pulse b is not applied at all as shown by the data signal waveform CC in FIG. 25. Similarly, in case where all the pixels on the same data electrode display U2 state, the data signal waveform BB is adopted. Consequently, the fluctuation (of liquid crystal molecules) having limited a drive margin heretofore is suppressed and the change in display color due to the fluctuation is also not recognized, thus providing a wider drive margin.

Figure 26:
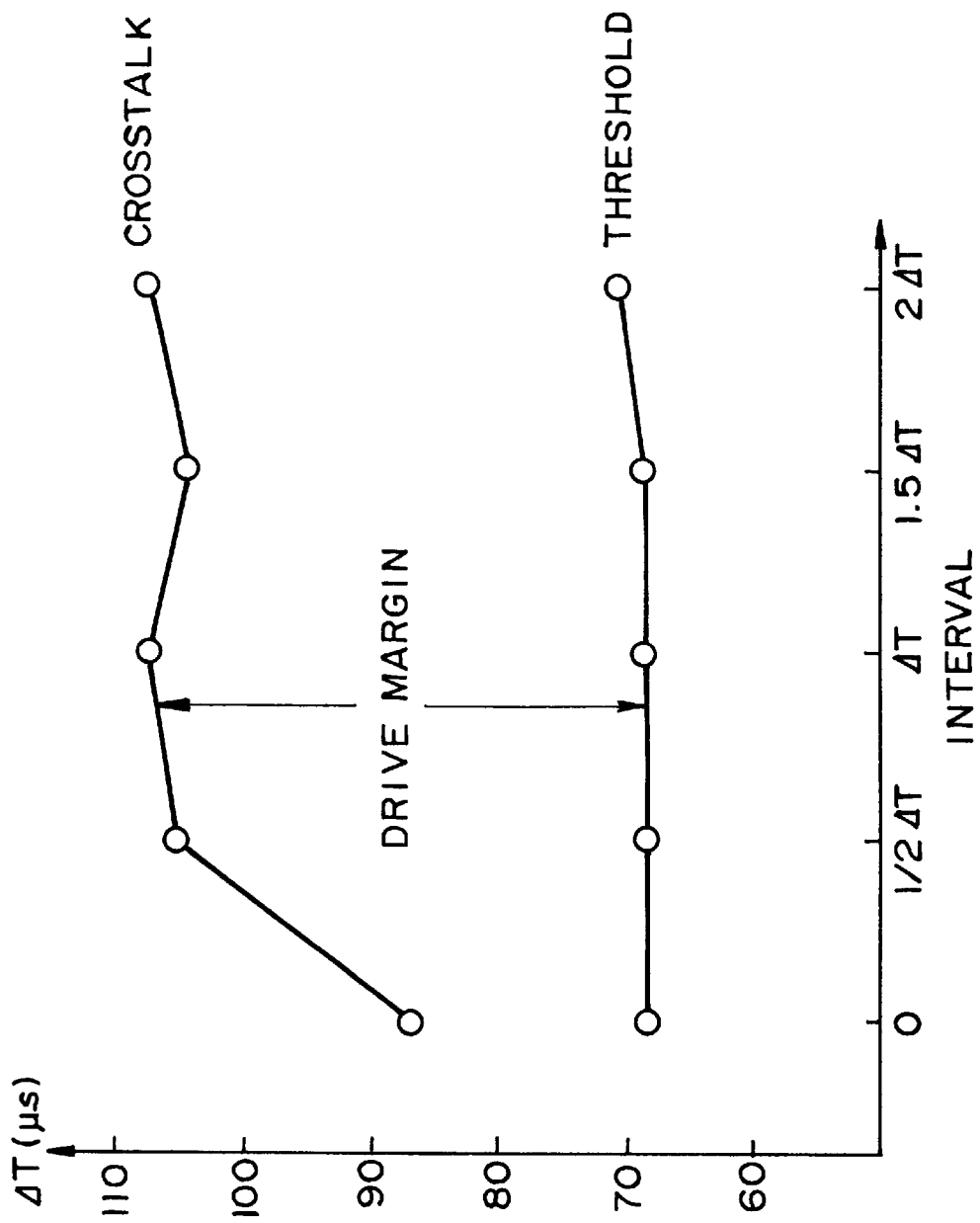
FIG. 26 is a graph showing a relationship between different intervals of selection period and corresponding drive margins of the color liquid crystal display apparatus of the invention.

We have also found that a drive margin (width) is saturated at an interval (int) of about (½)ΔT as shown in FIG. 26 when a relationship between the interval and the drive margin has been examined while increasing the interval by (½)ΔT. More specifically, measurement of data shown in FIG. 26 is performed under the following conditions:

Display apparatus: A color liquid crystal display apparatus as shown by the block diagram of FIG. 17 including the above-mentioned color liquid crystal panel (using Blank cell 1) as a display portion 101.

Temperature: 10° C.

Waveform: waveform of FIG. 24

Drive conditions: $V_1$=14.3 (V), $V_2$=−14.3 (V), $V_3$=5.7 (V), $V_4$=−5.7 (V) and $V_5$=6.4 (V).

The drive margin (width) corresponds to a width of a duration ΔT (µs) capable of providing a good display state free from crosstalk.

As is understood from FIG. 26, the interval may desirably be as shorter as possible in order to increase a frame frequency, so that the interval may preferably be (½)ΔT in view of the drive margin and speed.

Further, the above measurement of drive margin may be performed by using a smaller increment of the interval (e.g., (⅓)ΔT, (¼)ΔT, etc.) but, in view of the structure of a drive circuit, a ratio between an interval and each pulse width may desirably be set so as to provide a simple integer. This is because a reference clock of a drive circuit system is set so as to have a value integer times values of a selection pulse, an auxiliary pulse an an interval by dividing one horizontal scan period (1 H) for providing a prescribed waveform, so that, if a ratio of pulse widths becomes too complicated, the clock becomes very quick. As a result, it becomes necessary to provide a circuit giving an excessively high response speed, thus resulting in expensiveness.

In the present invention, by providing an applied pulse with an interval of at least (½)ΔT when a selection period of ΔT is set, an application frequency (opportunity) of pulses providing U1 and U2 states, respectively is decreased, thus attaining a wider driving margin, a high frame frequency and a simplified drive circuit at the same time.

The display apparatus used in the above-mentioned measurement was driven at 10° C. with the waveforms shown in FIGS. 23 and 24 under drive conditions of: $V_1$=14.3 (V), $V_2$=−14.3 (V), $V_3$=5.7 (V), $V_4$=−5.7 (V), ($V_5$=6.4 (V)), and a duration ΔT=80 (µsec), whereby a good display state was confirmed over the entire display area of the display portion 101.

Further, in the case of a temperature higher than a prescribed temperature, the drive signal waveforms as shown in FIGS. 18–22 are used, whereby one horizontal scan period (1 H) is shortened to realize high-speed display.

As described above, according to the color liquid crystal display apparatus according to the present invention, by providing the substrate having thereon the color filter with wider scanning electrodes and applying thereto a scanning signal, it is possible to minimize an unevenness of the above substrate surface (contacting the liquid crystal layer) thereby to allow a good drive operation of the device. Particularly, in combination with the driving conditions as described above, it is possible to effect a good display with a wide drive margin in any operation condition. Further, by appropriately selecting a drive waveform, high-speed driving and high-quality image display free from flickering on a picture area can also be accomplished.

Incidentally, flickering on a (display) picture (due to a periodical change in luminance over the entire picture area) is particularly observed when a multiplexing drive is performed.

Hereinbelow, the liquid crystal device according to the present invention particularly having solved the problem of flickering in multiplexing drive using a chiral smectic liquid crystal will be specifically described.

As a driving method of the liquid crystal device described herein, a multiplexing drive (scheme) wherein, to the above-described matrix electrode structure constituted by a group of scanning electrodes and a group of data electrodes, a sequential scanning signal (waveform) is applied with respect to the scanning electrode and a data signal (waveform) is applied with respect to the data electrode in synchronism with the scanning signal is generally used.

When the multiplexing drive scheme is adopted in a chiral smectic liquid crystal device (a liquid crystal device using a chiral smectic liquid crystal), the above-mentioned flickering phenomenon is observed in some cases at the time of effecting a drive (referred to s "refreshing drive" wherein a scanning signal (waveform) is repeatedly and periodically applied to a group of scanning electrodes.

According to the present invention, such a flickering phenomenon can be obviated by using a color liquid crystal display apparatus, including: a liquid crystal device, comprising: a pair of oppositely disposed first and second substrates each provided with a group of transparent electrodes in the form of stripes, and a liquid crystal layer comprising a chiral smectic liquid crystal disposed together with spacer beads between the pair of substrates, the first substrate having thereon a color filter comprising plural color filter segments and a coating layer, wherein the transparent electrodes on the second substrate have a width smaller than that of the transparent electrodes on the first substrate, scanning signal supply means for supplying scanning signals to the transparent electrodes on the first substrate, and data signal supply means for supplying data signals including an interval at a prescribed temperature or below to the transparent electrodes on the second substrate, each of the data signals corresponding to each of color filter segments of the color filter.

This liquid crystal device is characterized by having a light-interrupting layer corresponding to a part of a pixel disposed on one of the pair of substrates.

The flickering phenomenon recognized during the multiplexing drive is considered to occur due to an irregular (abnormal) inversion domain occurring in an end region of the pixel.

In the above liquid crystal, such an end region of the pixel is covered by the light-interrupting layer while leaving the pixel with a sufficient opening, thus alleviating a deterioration in image quality due to flickering on a (display picture) area.

The above liquid crystal device using the light-interrupting layer according to the present invention will be described in detail with reference to FIGS. 27–32 and FIGS. 2–4.

In the following identical structure members (elements) shown in FIGS. 27–30 are represented by identical reference numerals, respectively.

FIG. 27 shows a schematically illustrated matrix electrode structure of an embodiment of the above liquid crystal device of the invention.

Referring to FIG. 27, a reference numeral 112a represents a group of transparent electrodes (signal or data electrodes) formed on an upper (first) substrate and a reference numeral 112b represents a group of transparent electrodes (scanning electrodes) formed on a lower (second) substrate. These groups of transparent electrodes 112a and 112b intersect with each other at right angles between the pair of oppositely disposed upper and lower substrates to form a plurality of pixels at intersections thereof.

FIG. 28 is a schematically enlarged view of each intersection of the electrode groups shown in FIG. 27, i.e., one pixel wherein a light-interrupting layer 122 is provided to an end portion (section) of an arbitrary one pixel 121 constituted by transparent electrodes 112a and 112b at one intersection thereof.

Referring to FIG. 28, a irregular inversion domain 123 is completely covered with the light-interrupting layer 122 at the end portion of the pixel 121. The upper and lower substrates are subjected to rubbing in direction of arrows 124 and 125, respectively, at a prescribed crossing (intersection) angle. In the pixel 121, a hairpin defect 127 and a lightning defect in pairs 128 are present in a position of a spacer bead 126.

Figure 29:
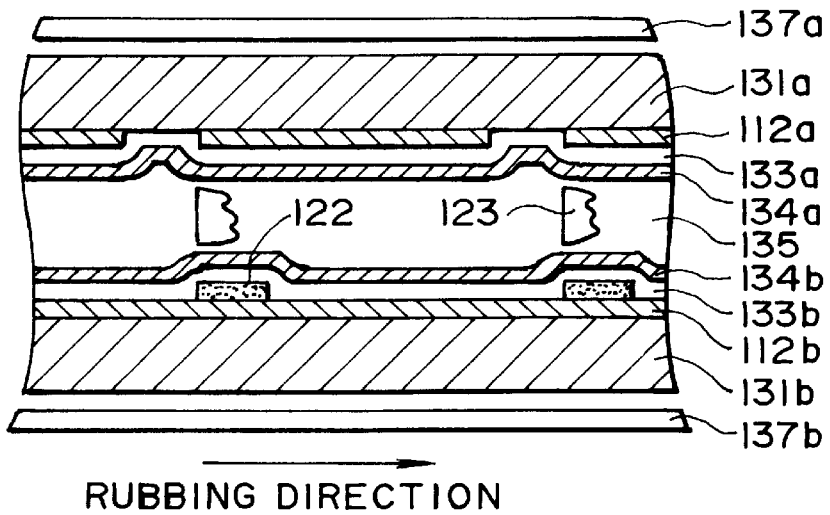
FIG. 29 is a partial sectional view of the pixel shown in FIG. 28 taken along line A—A in FIG. 28.

FIG. 29 is a partially enlarged sectional view of the liquid crystal device according to the present invention taken along line A—A in FIG. 28.

Referring to FIG. 29, the liquid crystal device includes a pair of upper and lower (first and second) substrates 131a and 131b, insulating films 133a and 133b, alignment control films 134a and 134b, and a liquid crystal 135. Outside the substrates 131a and 131b, a pair of polarizers 137a and 137b are disposed in, e.g., cross nicols.

More specifically, as shown in FIG. 29, the liquid crystal device includes a pair of parallel substrates 131a and 131b, opposite to each other, each provided with a 300–3000 Å-thick transparent electrode (112a, 112b), and a liquid crystal 135 (e.g., chiral smectic liquid crystal) disposed between electrode substrates (131a and 112a, and 131b and 112b). On a part (portion) of the (lower) transparent electrode 112b, a light-interrupting layer 122 is formed so as to overlap (or cover) with an irregular inversion domain 123 occurring in the liquid crystal layer 135. On the transparent electrodes 112a an 112b, insulating films 133a and 133b (thickness=100–3000 Å) are formed, respectively, in order to improve controllability to the liquid crystal 135 and to prevent short-circuiting. The insulating films 13a and 133b may have a single layer structure or a lamination structure and may be composed of a material identical to those for the short-circuit prevention layers 8a and 8b and the roughened surface-forming layers 9a and 9b as shown in FIGS. 2–6 described hereinabove.

The alignment control films 134a and 134b may generally have a thickness of 50–1000 Å and may generally comprise a polymeric material, particularly preferably fluorine-containing polyimide providing a high pretilt angle (an inclination angle with respect to the alignment control film face). In addition, the alignment control films 134a and 134b may be composed of a material identical to those for the alignment layers 10a and 10b shown in FIGS. 2–6 described hereinabove.

At least one of the alignment control films 134a and 134b are subjected to uniaxial aligning treatment by effecting, e.g., rubbing at the surface thereof in the rubbing directions 124 and 125 (as shown in FIG. 28), respectively. The crossing angle of the rubbing directions (uniaxial aligning direction) 124 and 125 may be at most 20 degrees, whereby a uniform alignment state (particularly C1 uniform (alignment) state) of chiral smectic liquid crystal molecules can be stably exhibited, thus realizing a high contrast ratio.

The liquid crystal used in the above liquid crystal device may contain the above-mentioned mesomorphic compounds of the formulae (1)–(5) and the optically active compound and may preferably be a chiral smectic liquid crystal composition (mixture) having a chiral smectic phase (SmC*, SmH*, SmI*, SmK*, SmG*, etc.), particularly further having cholesteric phase at a higher temperature.

The above liquid crystal device of the invention may, e.g., be prepared as follows. In the following, however, the light-interrupting layer 12 is described separately later for convenience of explanation.

Two 1.1 mm-thick glass plates 131a and 131b were provided with 1500 Å-thick ITO transparent electrodes 112a and 112b in the form of stripes (width 170 μm, spacing 30 μm) by sputtering. On the electrode 11b, a light-interrupting layer 122 was formed (specifically described hereinafter). On the electrodes 112a and 112b, 900 Å-thick $Ta_2O_5$ films for preventing short-circuiting were formed by sputtering, and thereonto 1200 Å-thick application-type insulating layers (Ti/Si=1/1, mfd. by Tokyo Ohka K.K.) for modifying a surface state of their upper layers were applied, followed by baking at 300° C. to constitute insulating films 133a and 133b.

A 1.5%-solution of polyamic acid ("LQ-1802", mfd. by Hitachi Kasei Kogyo K.K.) in mixture solvent (NMP/nBC=1/1) was applied onto the insulating films 1133a and 133b by using a spinner (2000 rpm, 20 sec.), followed by baking at 270° C. for 1 hour and further by rubbing to form 200 Å-thick alignment control layers 134a and 134b.

The rubbing treatment was performed by pressing a cylindrical rubbing roller the (peripheral) surface of which a rubbing cloth (e.g., nylon) on the alignment control layer surface on the glass substrate at a prescribed pressure and moving the glass substrate in a prescribed (rubbing) direction while rotating the rubbing roller, whereby an alignment control power was imparted to the alignment control layer.

The alignment control power generally varies depending on an abutting (pressing) pressure of the rubbing roller against the alignment control film on the glass substrate and may desirably be controlled by moving the rubbing roller in vertical direction (changing/pressing depth) to provide an appropriate contact area between the rubbing cloth and the alignment control film.

On one of the above-prepared substrates, spacer beads 126 (silica beads, 1.1 μm-dia.) was dispersed, and on the other substrate, a sealing agent (epoxy resin adhesive) was formed in a prescribed pattern at the periphery part thereof by screen printing, followed by adhesive bonding of the substrates to each other to provide a prescribed cell gap (about 1.1 μm).

In the above, the spacer beads may be alumina beads and may have a diameter in the range of 0.1–3.5 μm. Further, the cell gap (the liquid crystal layer thickness) may appropriately be controlled depending on liquid crystal materials used (or display mode adopted). In the case of using a chiral smectic liquid crystal is used, the layer thickness may preferably be set to be a very small thickness sufficient to suppress the formation of helical structure intrinsic to the liquid crystal in a bulk state.

Into a gap between the upper and lower substrates prepared above, a chiral smectic liquid crystal (identical to that injected into Blank cells 1 and 2 described above) heated to an isotropic liquid was injected under reduced pressure by capillary action, followed by gradual cooling to align liquid crystal molecules, whereby a liquid crystal device characterized by having the light-interrupting layer according to the invention was prepared.

In the same manner, a comparative liquid crystal device was prepared except for omitting (not forming) the light-interrupting layer 122.

Figure 31:
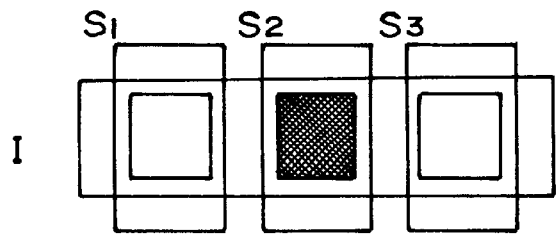
FIG. 31 is a display pattern on some pixels as to an embodiment of the liquid crystal device of the invention.
Figure 32:
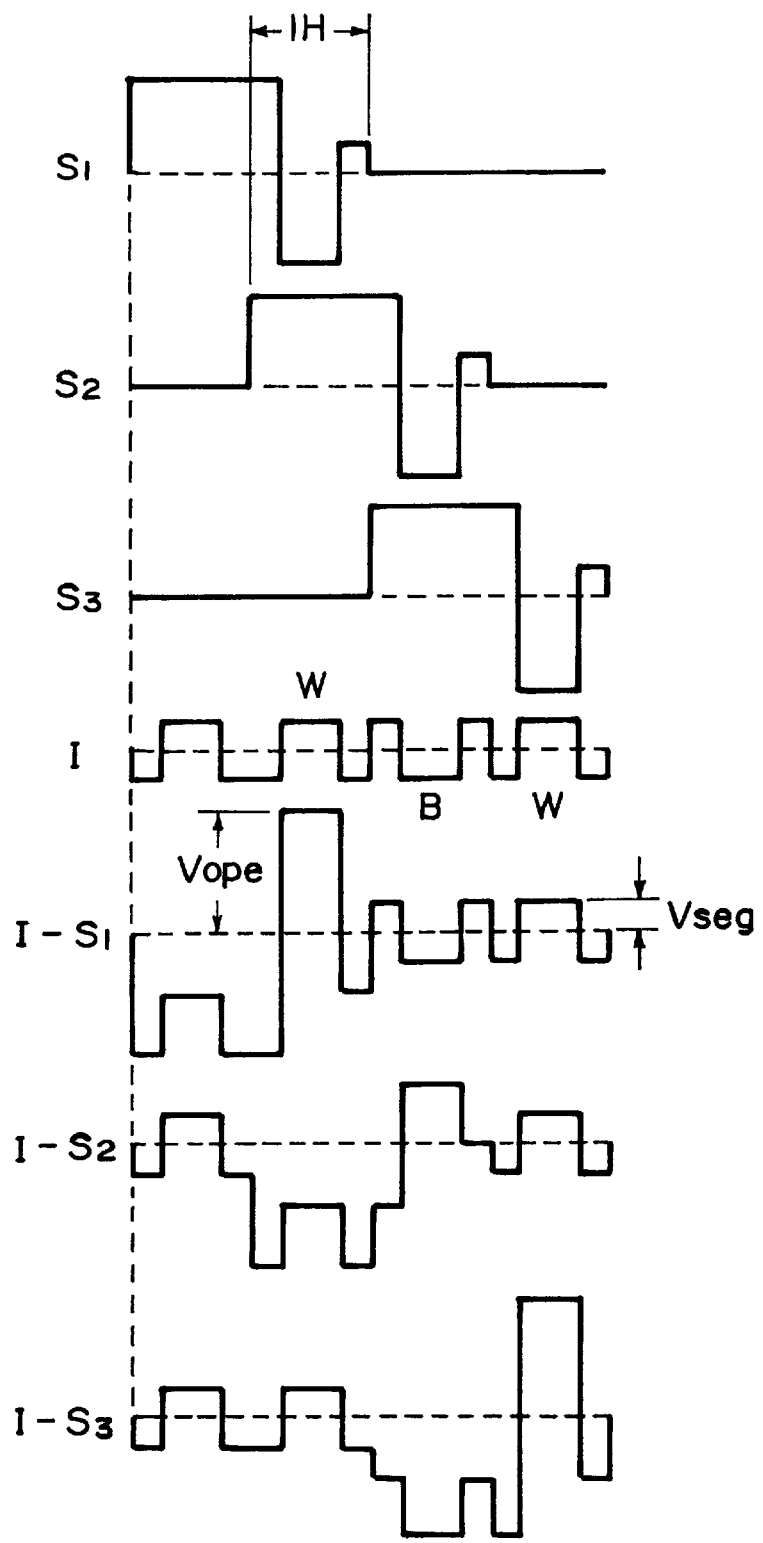
FIG. 32 is a time chart showing a set of drive waveforms for displaying the pattern shown in FIG. 31.

When the comparative liquid crystal device was driven by applying a drive waveform (Vope=20 V, Vseq=5.7 V) including a scanning signal ($S_1$, $S_2$, $S_3$) and a data signal I in combination shown in FIG. 32 for displaying a display image (alternating "white" and "black") shown in FIG. 31 to scanning electrodes repeatedly and periodically in synchronism with the data signal I applied to the corresponding data electrode (i.e., effecting refreshing drive), flickering on a picture area was confirmed.

As a result of further investigation, we have found that an irregular inversion domain (as shown by 123 in FIG. 29) is present in an end position (portion) of each pixel and charges its size by the above refreshing drive. We have also ascertained that such an irregular inversion domain 123 extends (originates) from region in the liquid crystal layer 135 corresponding to an edge line (ridge) of the upper transparent electrode 112a closer to the lightning defect 128 than the hairpin defect 127 as shown in FIGS. 28 and 29 when these defects (128, 127) are caused to occur. In other words, taking a positional relationship among the rubbing directions (124, 125), the lightning defect 128 and the hairpin defect 127 within respect to alignment of the chiral smectic liquid crystal as shown in FIG. 28 into account, it has been found that the above edge line is present at a lower edge portion of each pixel as shown in FIG. 28, which is also located in a position closer to a rubbing start position (lower side in FIG. 28) and is defined by the upper transparent electrode 112a disposed perpendicular to the average rubbing direction (a direction of the center line between the arrows 124 and 125 shown in FIG. 27). The above lightning and hairpin defect (128, 127) is capable of arbitrarily occurring in a domain e.g., in a C1 uniform alignment state of the liquid crystal to provide another alignment state (e.g., C2 alignment state) under the influence of presence of a contaminant or local strain within the cell.

In view of the above, according to the present invention, by providing the light-interrupting layer 122 in a region (an end portion of the pixel) corresponding to the irregular inversion domain 123 so as to visually hide the irregular inversion domain 123, the flickering due to the domain 123 is minimized or suppressed. Specifically, the light-interrupting layer 122 is formed on the lower transparent electrode 112b in a position corresponding to an end portion of each pixel having the side line located, e.g., on the left-hand side of the rubbing direction in FIG. 29 on the drawing in order to light-interrupt the irregular inversion domain 123 having an edge forming an angle of 50–90 degrees with the rubbing direction 124.

The light-interrupting layer may be patterned in an appropriate form, e.g., stripes (preferably black stripes as mentioned hereinabove) in view of the structure to a cell used (e.g., a color liquid crystal device). In a liquid crystal device, other than that shown in FIGS. 28 and 29, having a light-interrupting layer patternized in black matrix (i.e., plural end portions of each pixel is covered by the light-interrupting layer), it is possible to form the widest light-interrupting layer (having the longest distance to a light-transmission region of the adjacent pixel) at an end portion at which the irregular inversion domain occurs.

Examples of a material for the light-interrupting layer 122 may be identical to those for the auxiliary electrodes 7a and 7b shown in FIGS. 2–6 described hereinbefore. A particularly preferred material therefor is low-resistance metal (e.g., molybdenum). The light-interrupting layer 122 may be formed in a single or lamination layer (total thickness of about 1500 Å) by, e.g., sputtering.

Figure 30:
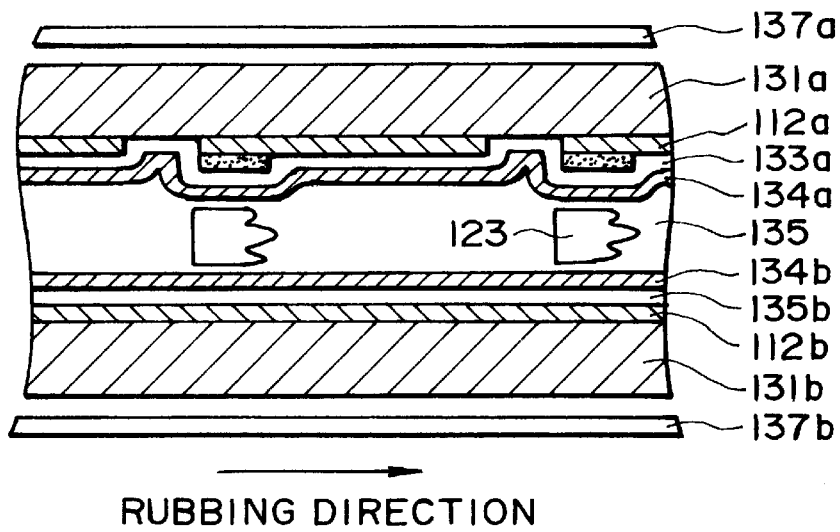
FIG. 30 is a partial sectional view of another embodiment of one pixel having a light-interrupting layer on a substrate other than that of FIG. 29.

FIG. 30 shows a schematic sectional view of the liquid crystal device identical to that of FIG. 29 except that the light-interrupting layer 122 is formed on the upper transparent electrode 112a.

In this liquid crystal device (shown in FIG. 30), the light-interrupting effect of the light-interrupting layer 122 is somewhat lowered compared with that of the device shown in FIG. 29 since the light-interrupting layer 122 is formed on the transparent electrode 112a having the edge line corresponding to the origination position of the irregular inversion domain 123 thereby to extend the irregular inversion domain 123. In this case, however, the light-interrupting layer 122 is effective in lowering an electrode resistance since the layer 122 is formed on the transparent electrode 112a in its length (longitudinal) direction. Further, the transparent electrode 112b may be formed in various patterns (e.g., as shown in FIG. 9) having an edge line substantially perpendicular to the average rubbing direction. In case where the lower transparent electrode 112b has the edge line similar to that of the upper transparent electrode 112a in the form of stripes as shown in FIG. 29, the arrangement of the light-interrupting layer 122 as shown in FIG. 30 is effective in hiding the irregular inversion domain 123 originated from the edge line of the lower transparent electrode 122b.

The problem of an occurrence of the irregular inversion domain originated from the edge line perpendicular to the average rubbing direction is common to the monochromatic liquid crystal devices as shown in FIGS. 27–30 and the color liquid crystal device as described hereinabove.

With reference to FIGS. 2–4, the irregular inversion domain and the light-interrupting layer for hiding the irregular inversion domain will be explained in the case of using the color liquid crystal device.

In case where the color liquid crystal device shown in FIGS. 2 and 3 has an average rubbing direction from the left side to the right side on the drawing, the irregular inversion domain occurs in the liquid crystal layer 13 originated from the left-hand edge line of each stripe electrode 6b (which lines also provide the alignment layer 10a surface with an unevenness (not shown)) and extends toward the right side in the average rubbing direction. In this case, the auxiliary electrode 7a corresponding the above edge line of the electrode 6b on the first substrate side and the auxiliary electrode 7b covering the above edge line of the electrode 6b on the second substrate also function as the light-interrupting layer in combination, thus hiding the irregular inversion domain from an observer.

On the other hand, in case where the color liquid crystal device shown in FIGS. 2 and 4 has an average rubbing direction from the left side to the right side on the drawing (FIG. 4), the irregular inversion domain occurs in the liquid crystal layer B originated from the left-hand edge lines of each stripe electrodes 6a and 6b (which lines also provide the surfaces of the alignment films 10a and 10b with an unevenness (not shown), respectively) and extends rightward on the drawing (FIG. 4). In this case, the auxiliary electrode 7a and the light-interrupting layer 14 each corresponding to the edge lines of the electrodes 6a and 6b together function as a light-interrupting layer for preventing the irregular inversion domain from being recognized by an observer.

As described above, according to the present invention, by providing a light-interrupting layer in a portion corresponding to an end portion of each pixel including an edge line closer to a rubbing initiation (starting) position and perpendicular to an average rubbing direction the irregular inversion domain leading to flickering on a display picture area is effectively light-interrupted to minimize the flickering, thus improving a display quality.

What is claimed is:

1. A process for producing a liquid crystal device, comprising the steps of:

forming on a first insulating substrate a light-interrupting layer, a color filter comprising plural color filter segments, a coating layer, a barrier layer, a transparent electrode, an auxiliary electrode, a short-circuit prevention layer, a roughened surface-forming layer, and an insulating layer in succession in this order, forming on a second insulating substrate a transparent electrode, an auxiliary electrode, a short-circuit prevention layer, a roughened surface-forming layer, and an insulating layer in succession in this order, rubbing the surface of each of the insulating layers on the first and second substrates, dispersing adhesive beads over the insulating layer surface formed on one of the first and second substrates, disposing a sealing agent having a prescribed pattern on the insulating layer surface formed on one of the first or second substrates, dispersing spacer beads over the insulating layer formed on the other substrate having thereon no adhesive beads, adhesively bonding the first and second substrate to each other while fixing said one of the first and second substrates over which the adhesive beads are dispersed so as to direct a dispersion face of the adhesive beads upward, scribing the first and second substrates to remove an unnecessary portion, injecting a chiral smectic liquid crystal from an injection port into a gap between the first and second substrates, and sealing up the injection port.

2. A process according to claim 1, wherein each of the first and second insulating substrates comprises a glass plate immediately on which an undercoat layer comprising $SiO_2$ is formed in a thickness of 200–1000 Å.

3. A process according to claim 1, wherein the light-interrupting layer comprises a black stripe composed of an alloy of Mo and Ta having a thickness of 500–1500 Å.

4. A process according to claim 1 wherein the color filter comprises a resin layer having a thickness of 1.0–2.0 μm and comprising plural photosensitive resins containing at least one pigment.

5. A process according to claim 4, wherein the photosensitive resins comprise polyamide.

6. A process according to claim 1, wherein the coating layer comprises an organic silane-based resin layer having a maximum thickness of 1.5–5 μm.

7. A process according to claim 1, wherein the barrier layer comprises an $SiO_2$ layer having a thickness of 100–1000 Å.

8. A process according to claim 1, wherein each of the transparent electrodes formed on the first and second substrates comprises an ITO layer having a thickness of 300–3000 Å.

9. A process according to claim 1, wherein each of the auxiliary electrodes formed on the first and second substrates comprises a metal lamination layer of Mo-Ta/Al/Mo-Ta having a thickness of 500–2500 Å.

10. A process according to claim 1, wherein each of the short-circuit prevention layers formed on the first and second substrates comprises a lamination layer including a $Ta_2O_5$ layer having a thickness of 500–1200 Å and a Ti-Si layer disposed thereon having a thickness of 500–1000 Å.

11. A process according to claim 1, wherein each of the roughened surface-forming layers formed on the first and second substrates comprises a Ti-Si layer having a thickness of 100–300 Å and containing $SiO_2$ beads dispersed therein having a diameter of 300–700 Å.

12. A process according to claim 1, wherein each of the insulating layer comprises a polyimide film having a thickness of 50–1000 Å.

13. A process according to claim 1, wherein the rubbing step is performed by rubbing the surface of the insulating layer with a rubbing roller about which a raised rubbing cloth comprising aramide fiber is wound.

14. A process according to claim 1, wherein the dispersion of the adhesive beads on one substrate is performed by dispersing adhesive beads comprising a thermosetting resin having a diameter of 2–10 μm in a solvent at a density of 50–130 particles/mm$^2$ in a region corresponding to a sealing area within a sealing portion of the other substrate.

15. A process according to claim 14, wherein the thermosetting resin comprises epoxy resin or acrylic resin.

16. A process according to claim 1, wherein the sealing agent comprises a thermosetting resin.

17. A process according to claim 1, wherein the dispersion step of the spacer beads is performed by dispersing the spacer beads in ethanol so as to provide a density of 100–700 particles/mm$^2$.

18. A process according to claim 17, wherein the spacer beads comprise silica beads having a diameter of 0.6–3.5 μm.

19. A process according to claim 1, wherein the adhesive beads and the spacer beads are dispersed on the first substrate and the second substrate, respectively.

20. A process according to claim 1, wherein the first and second substrates are bonded to each other by hardening the sealing agent under pressure so that the resultant liquid crystal device has a cell gap of 0.5–3 µm.

21. A process according to claim 1, wherein, in the scribing step, the first and second substrates have different scribing positions.

22. A process according to claim 1, wherein, the sealing step of the injection port is performed by using a room temperature curing epoxy resin.

23. A process according to claim 1, wherein the spacer beads are dispersed over the insulating layer formed on the substrate having thereon the sealing agent.

24. A liquid crystal device, comprising:
a pair of oppositely disposed substrates each provided with a group of transparent electrodes in the form of stripes, and a liquid crystal disposed between the substrates, wherein
at least one of the groups of the transparent electrodes has an electrode structure wherein each transparent electrode is partially coated with an auxiliary electrode in its length direction and has both lead-out end sections in a region other than a display region, each lead-out end section including an exposed check portion where the auxiliary electrode is patternized so as to expose the transparent electrode and including a remaining portion coated with the auxiliary electrode, wherein
an exposed check portion of a transparent electrode is wider than a remaining portion of its transparent electrode and is not aligned with an exposed check portion of an adjacent transparent electrode but is aligned with an exposed check portion of a transparent electrode next to the adjacent transparent electrode in a direction of these transparent electrodes.

25. A device according to claim 24, wherein each of the exposed check portions has a projection portion at one lateral end thereof and has no projection portion at the other lateral end thereof.

26. A device according to claim 25, wherein the projection portion of each exposed check portion is located on one lateral end side and that of an adjacent exposed check portion is located on the other lateral end side of the adjacent exposed check portion.

27. A device according to claim 25, wherein the projection portion of each exposed check portion and that of an exposed check portion next to an adjacent exposed check portion extend in the same manner from the two check portions.

28. A device according to claim 25, wherein each exposed check portion having the projection portion is confronted with a narrower portion of an adjacent transparent electrode in its width direction, the narrower portion being free from an auxiliary electrode to expose the transparent electrode.

29. A device according to claim 24, wherein each of the exposed check portion has both end portions where the auxiliary electrode is connected so as to enclose the exposed check portion.

30. A device according to claim 24, wherein the device includes a dummy electrode in a region other than a display region.

31. A device according to claim 24, wherein the pair of substrates includes one substrate having thereon a color filter and a coating layer, and includes a liquid crystal layer comprising a chiral smectic liquid crystal as the liquid crystal disposed together with spacer beads between the pair of substrates, wherein
the liquid crystal layer has a thickness which is smaller than a diameter of the spacer beads and also smaller than a maximum thickness of the coating layer, the coating layer having a pencil hardness of at most 7 H.

32. A device according to claim 31, comprising a sealing agent disposed between the pair of substrates at a peripheral portion thereof, the coating layer extending to a portion corresponding to the peripheral portion.

33. A device according to claim 31, wherein the coating layer has a pencil hardness of 3 H–7 H.

34. A device according to claim 24, wherein the exposed check portions are respectively provided to both groups of the transparent electrodes of the substrates, each exposed check portion provided to one substrate being wider than each remaining portion provided to said one substrate and each exposed check portion provided to the other substrate having a width substantially identical to that of each remaining portion provided to said other substrate.

* * * * *

UNITED STATES PATENT AND TRADEMARK OFFICE
CERTIFICATE OF CORRECTION

PATENT NO. : 6,144,435
DATED : November 7, 2000
INVENTOR(S) : Yuko Yokoyama et al.

It is certified that error appears in the above-identified patent and that said Letters Patent is hereby corrected as shown below:

Title page, item [56] References Cited - Foreign Patent Documents
"5088164" should read -- 5-088164 --.

Column 2,
Line 53, "block)" should read -- black) --.

Column 3,
Line 28, "a" should read -- an --.

Column 6,
Line 60, "(or" should read -- or --.

Column 7,
Line 36, "in" should read -- is --.

Column 10,
Line 19, "an" should read -- and --.

Column 11,
Line 5, "ordinary" should read -- ordinarily --;
Line 22, "an" should read -- and --.

Column 13,
Line 30, "be" should be deleted.
Line 37, "each" should read -- to each --.

Column 14,
Line 34, "warkability" should read -- workability --;
Line 54-55, "is applied onto the above substrate each other" should read
-- are oriented --.

Column 15,
Line 48, "no or a little" should read -- little or no --.

UNITED STATES PATENT AND TRADEMARK OFFICE
CERTIFICATE OF CORRECTION

PATENT NO. : 6,144,435
DATED : November 7, 2000
INVENTOR(S) : Yuko Yokoyama et al.

It is certified that error appears in the above-identified patent and that said Letters Patent is hereby corrected as shown below:

Column 24,
Line 17, "R, G, G, W)." should read -- R, G, B, W). --;
Line 35, " "AA" " should read -- "A" --.

Column 25,
Line 20, "an" should read -- and --;
Line 20, "has" should read -- have --;
Line 28, "hand" should read -- than --;
Line 61, "shorter" should read -- short --.

Column 28,
Line 62, "1133a" should read -- 133a --.

Signed and Sealed this

Thirteenth Day of November, 2001

Attest:

*Nicholas P. Godici*

NICHOLAS P. GODICI
*Attesting Officer*   *Acting Director of the United States Patent and Trademark Office*